(12) United States Patent
Udd et al.

(10) Patent No.: US 7,038,190 B2
(45) Date of Patent: May 2, 2006

(54) FIBER GRATING ENVIRONMENTAL SENSING SYSTEM

(76) Inventors: Eric Udd, 2555 NE. 205th Ave., Fairview, OR (US) 97024; Sean G. Calvert, 2226 SW. Dunbar Pl., Troutdale, OR (US) 97060; Whitten L. Schulz, 22136 NE. Chinook Way, Fairview, OR (US) 97024; W. Marley Kunzler, 2632 NE. 7th Ct., Gresham, OR (US) 97030-5933; M. Wesley Kunzler, 3235 SE. 1st St., #3, Gresham, OR (US) 97080

( * ) Notice: Subject to any disclaimer, the term of this patent is extended or adjusted under 35 U.S.C. 154(b) by 293 days.

(21) Appl. No.: 10/325,874

(22) Filed: Dec. 20, 2002

(65) Prior Publication Data

US 2003/0127587 A1 Jul. 10, 2003

Related U.S. Application Data

(60) Provisional application No. 60/342,914, filed on Dec. 21, 2001.

(51) Int. Cl.
*G01J 1/04* (2006.01)

(52) U.S. Cl. .................... 250/227.11; 250/227.14
(58) Field of Classification Search ........... 250/227.11, 250/227.14, 227.16, 227.28; 356/32; 385/17, 385/47, 48; 340/555, 556, 557
See application file for complete search history.

(56) References Cited

U.S. PATENT DOCUMENTS

| 5,380,995 A | 1/1995 | Udd et al. |
| 5,397,891 A | 3/1995 | Udd et al. |
| 5,627,927 A | 5/1997 | Udd |
| 6,125,216 A * | 9/2000 | Haran et al. ................. 385/12 |
| 6,335,524 B1 | 1/2002 | Udd et al. |
| 6,600,149 B1 | 7/2003 | Schulz et al. |
| 6,683,297 B1 | 1/2004 | Schulz et al. |
| 6,756,580 B1 | 6/2004 | Schulz et al. |
| 6,788,835 B1 * | 9/2004 | Moslehi et al. ............. 385/13 |

OTHER PUBLICATIONS

W.L. Schultz et, al, Traffic Monitoring/Control and Road Condition Monitoring Using Fiber Optic Based Systems, SPIE Proceedings, vol. 3671, p. 109, 1999.
J. Seim et, al, "Health Monitoring of an Oregon Historical Bridge with Fiber Grating Strain Sensors," SPIE Proceedings, vol. 3671, p. 128, 1999.
Daniel Inaudi, "SOFO System: Users Manual", Vers. 1, p. 1-7, 1999.

* cited by examiner

*Primary Examiner*—Que T. Le

(57) ABSTRACT

A fiber grating environmental sensing system is described that has the ability to measure strain, vibration, humidity and water content. Fiber gratings are used to measure axial strain to accomplish these goals. An approach is described that uses matched fiber grating sensors and filters to allow for thermal compensation greatly reducing one of the key performance issues facing these systems. The system may be deployed in such applications as roadways and paved surfaces, bridges, buildings and aircraft and spacecraft. Means are described to implement transducers optimized for specific environmental measurements as well as means to demodulate the fiber grating sensors.

16 Claims, 42 Drawing Sheets

FIBER GRATING ENVIRONMENTAL SENSING SYSTEM

This application claims the benefit of U.S. Provisional Application No. 60/342,914 by Eric Udd, Sean G. Calvert, Whitten L. Schulz, W. Marley Kunzler, and M. Wesley Kunzler, "Fiber Grating Sensor Systems" which was filed on Dec. 21, 2002.

This invention was made with Government support from contract DEFG03-99ER82753 awarded by DOE and contract N00421-02-C-3081 awarded by NAVAIR. The government has certain rights to this invention.

REFERENCE TO RELATED PATENTS

This disclosure describes means to enhance the accuracy and sensitivity of fiber grating sensors systems to measure environmental effect. The background of these types of fiber grating sensors may be found in U.S. Pat. Nos. 5,380,995, 5,402,231, 5,592,965, 5,841,131 and 6,144,026. The teachings in those patents are incorporated into this disclosure by reference as though fully set forth below.

BACKGROUND OF THE INVENTION

This invention relates generally to fiber optic grating systems and more particularly, to the measurement of environmental effects using fiber optic grating sensors. Typical fiber optic grating sensor systems are described in detail in U.S. Pat. Nos. 5,380,995, 5,402,231, 5,592,965, 5,841,131 and 6,144,026.

The need for low cost, high performance fiber optic grating environmental sensor system that is capable of long term environmental monitoring, virtually immune to electromagnetic interference and passive is critical for such applications as moisture sensing and monitoring of adhesive bonds. Another advantage of these systems is that when they are appropriately configured the frequency response of the system can be very high.

The present invention includes fiber grating sensors that may be configured in appropriate transducers to sense environmental changes such as moisture, pressure, strain and temperature by using appropriate transducers. Means are also described to greatly reduce temperature sensitivity while enhancing accuracy and sensitivity.

In U.S. Pat. Nos. 5,380,995 and 5,397,891 fiber grating demodulation systems are described that involve single element fiber gratings and using spectral filters to demodulate fiber gratings. The present invention includes means to extend the demodulation system to enhance sensitivity and reduce temperature dependence. In U.S. Pat. Nos. 5,591, 965, 5,627,927 the usage of fiber gratings to detect more than one dimension of strain is described. These ideas are extended in U.S. Pat. Nos. 5,869,835, 5,828,059 and 5,841, 131 to include fibers with different geometries that can be used to enhance sensitivity or simplify alignment procedures for enhanced sensitivity of multi-parameter fiber sensing. In U.S. Pat. No. 6,335,524, "High Speed Demodulation Systems for Fiber Grating Sensors", by Eric Udd and Andreas Weisshaar means are described to process the output from multiaxis fiber grating sensors for improved sensitivity. All of these patents' teachings are background for the present invention which optimizes the fiber grating sensor for optimum response to strain changes with reduced temperature sensitivity induced by changes in the state of its transducer to form water/chemical sensors, pressure and strain sensors.

The present invention consists of an optical fiber whose axial and or temperature sensitivity has been optimized through the construction of the optical fiber or mechanical mechanisms to enhance sensitivity. Temperature compensation is provided by a second fiber grating filter that is placed for first order temperature correction.

Therefore, it is an object of the present invention to monitor changes in moisture or chemical content of an environment through measured strain changes.

Another object of the invention is to provide a means of monitoring strain with reduced temperature sensitivity.

Another object of the invention is to reduce low frequency mechanical vibration noise from high frequency mechanical vibration signals.

Another object of the invention is to measure temperature with high accuracy and repeatability.

These and other objects and advantages of the present invention will become apparent to those skilled in the art after considering the following detailed specification including the drawings wherein:

DETAILED DESCRIPTION OF THE INVENTION

Figure 1:
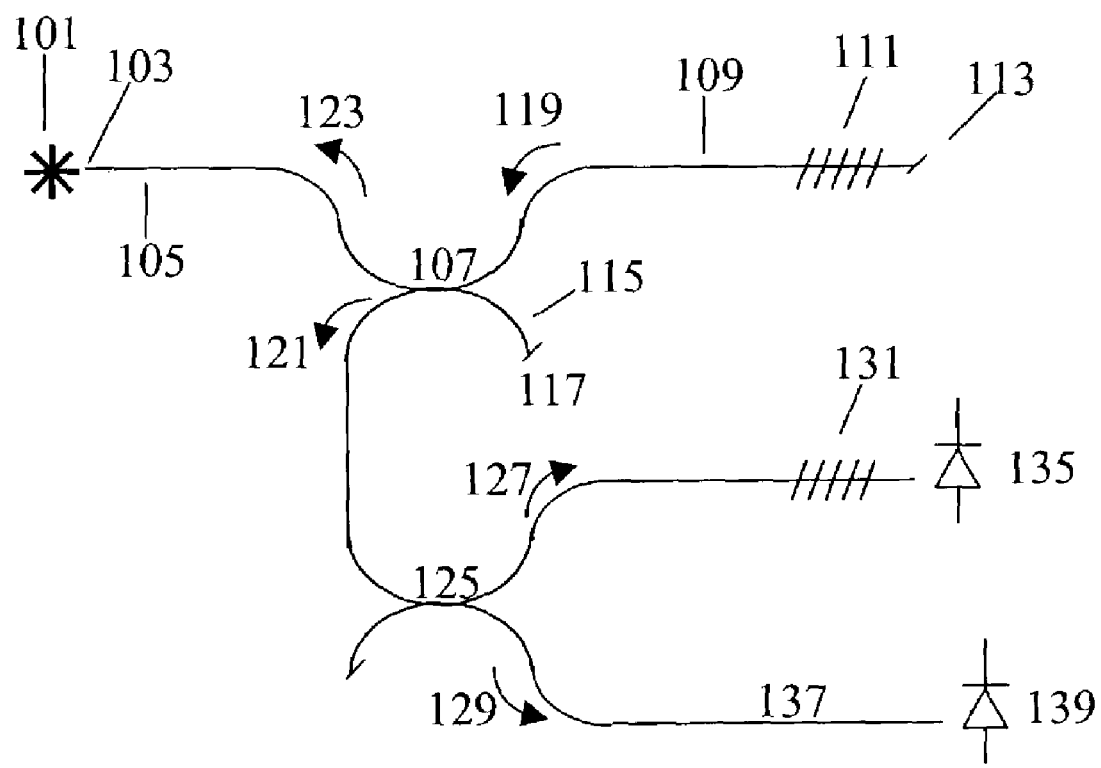
FIG. 1 is an illustration of a prior art fiber grating sensor readout unit.

In the present invention, environmental sensing systems based on fiber gratings are described. Fiber grating strain sensors offer a series of advantages that include the ability to wavelength encode a series of fiber grating sensors easily into an array on a single fiber with relative ease of fabrication. The environmental information sent back by a fiber grating sensor is encoded in wavelength changes that in turn need to be measured by a read out unit in order to accurately interpret environmentally induced changes. Many methods can be used to read out wavelengths including optical spectrum analyzers that are commercially available from Ando, Hewlett Packard and Anritsu, etalon based readout units that are available from Micron Optics and Research International (U.S. Pat. No. 5,397,891 by Udd and Clark) and fiber grating filter readout systems sold by Blue Road Research (U.S. Pat. No. 5,380,995 by Udd and Clark). For many applications it is necessary to have readout system that have high sensitivity and operate at high speed. A configuration that has been used by Blue Road Research is sold commercially is shown in FIG. 1 and described in W. Schulz, J. Conte, E. Udd, J. Seim, "*Static and Dynamic Testing of Bridges and Highways using Long-Gage Fiber Brag Grating Based Strain Sensors*", SPIE Proceedings, Vol. 4202, p. 79, 2000. This prior art system consists of a light source 101 that may be a broadband light emitting diode that couples light into an optical fiber end 103. The light in the fiber 105 is then coupled into the fiber beamsplitter 107 and a portion of the light is directed into the optical fiber 109 that contains the optical fiber grating 111. A portion of the light beam entering the fiber 109 from the beamsplitter 107 is reflected by the fiber grating 111 back to the fiber beamsplitter 107 while the remainder of the light beam propagates toward the fiber end 113 and exits the system. A second portion of the light from the fiber beamsplitter 107 is directed into the optical fiber 115 and exits the system via the end 117 that is arranged to minimized back reflection. The light beam 119 that is reflected off the fiber grating 111 is directed back into the fiber beamsplitter 107 and split into the light beams 121 and 123. The light beam 123 is directed back into the fiber 105 and towards the light source. The light beam 121 is directed toward the second fiber beamsplitter 125 and split into the light beams 127 and 129. The light beam 127 is then directed toward the filter 131 that might be a fiber grating filter and then falls onto the output detector 135. The light beam 129 propagates via the optical fiber 137 to the output detector 139. Because the light beam amplitude intensity of the light beam 127 is modulated by the action of the optical filter 131 as a function of wavelength the wavelength reflected by the fiber grating sensor 111 can be determined by taking the ratio of the outputs of the detectors 135 and 139. This can be done at very high speed, and Blue Road Research has built units operating at up to 10 MHz limited only by the electronics. Sensitivity can be adjusted by appropriately choosing the bandwidth of the filter. That is, as the slope of the filter in terms of intensity versus wavelength changes this will be a key factor in determining sensitivity. For this approach there is a tradeoff between sensitivity and dynamic range dictated by the characteristics of the filter.

Figure 2:
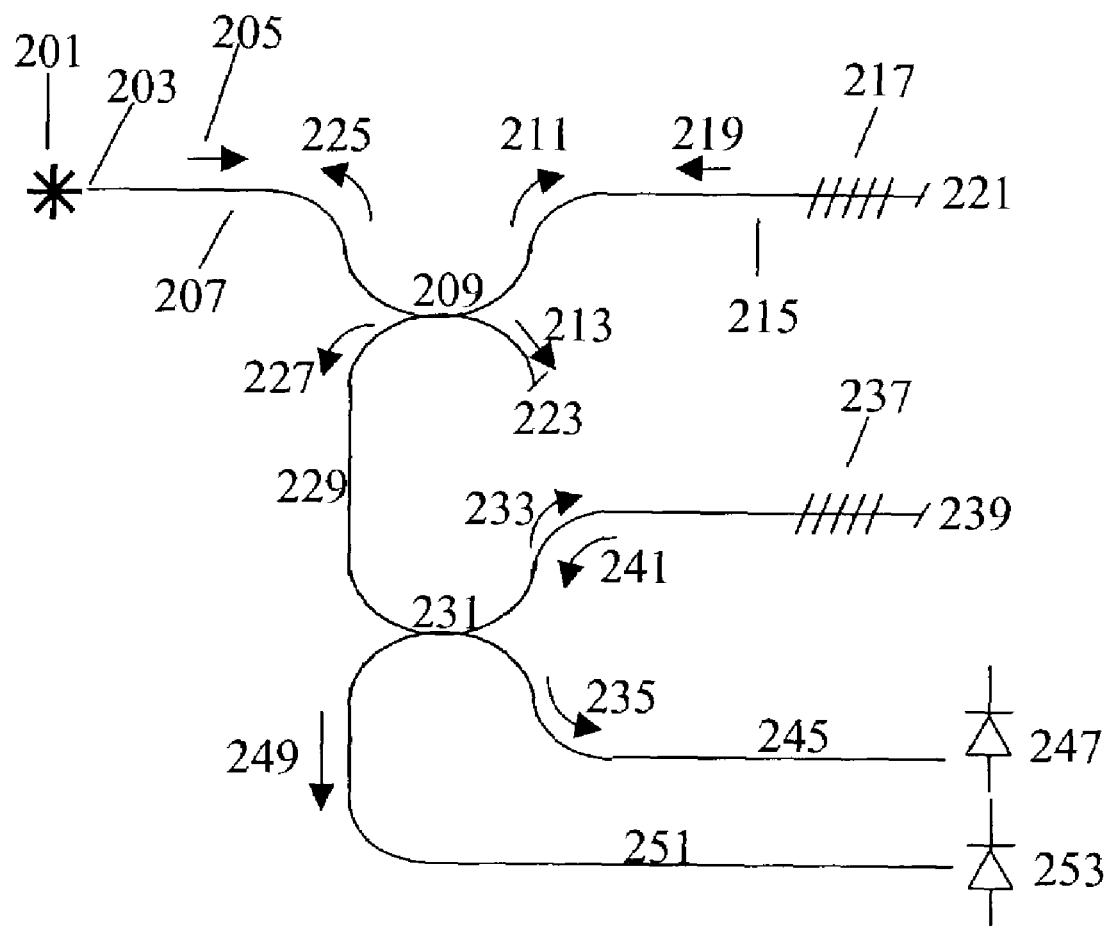
FIG. 2 is a diagram a fiber grating system with collocated fiber sensor and filter gratings.

A disadvantage of the readout system of FIG. 1 is that since the fiber grating sensor 111 and the filter 131 that may be a fiber grating are not collocated there may be temperature differences that result in a temperature induced error. By collocating the fiber grating sensor and the filter it would be possible to provide a system that would have automatic temperature compensation provided the fiber grating sensor and filter had comparable sensitivity. By selecting the filter to be a fiber grating matched in terms of thermal characteristics to the fiber grating sensor this may be achieved. FIG. 2 shows the basic layout of this type of system. It shares characteristics of readout systems described by Eric Udd and Tim Clark in U.S. Pat. No. 5,380,995 for example FIG. 21 in that patent. The major differences are that a second detector has been added to correct for amplitude fluctuations in the system and the fiber grating sensor and filter have been collocated spatially to insure the best possible temperature compensation.

In the diagram in FIG. 2 a light source 201 that may be a broadband light source such as a light emitting diode or fiber light source is used to inject a light into the fiber end 203. The resulting light beam 205 propagates along the optical fiber segment 207 to the fiber beamsplitter 209. The light beam 205 is split into the two light beams 211 and 213. The light beam 211 propagates along the optical fiber 215 to the fiber grating sensor 217. A portion of light beam 211 is reflected by the fiber grating sensor 217 as the light beam 219 whose wavelength is dependent on the environmentally induced state of the fiber grating 217. The other portion of the light beam 219 propagates past the fiber grating 217 and exits the system via the antireflecting end 221. The light beam 213 exits the system via the antireflecting end 223. The light beam 219 that is reflected from the fiber grating sensor 217 propagates back to the fiber beamsplitter 209. A portion of the light beam 219 is split into the light beam 225 that is directed back toward the light source 201. The second portion of the light beam 219 is split into the light beam 227, which propagates along the optical fiber segment 229 to a second fiber beamsplitter 231. The light beam 229 is split into the light beam 233 that propagates to the fiber grating filter 237 that may be located in close proximity to the fiber grating sensor 217 to minimize thermal sensitivity. A portion of the light beam 233 is reflected off the fiber grating filter 237 as the light beam 241 and a portion passes through the fiber grating filter 237 and exits the system via the nonreflecting end 239. The other part of the light beam 229 is split into the light beam 235 and directed via the optical fiber segment 245 to the output detector 247. The light beam 241 reflected off the fiber grating filter 237 enters the coupler 231 and a portion is directed as the new light beam 249 via the optical fiber segment 251 to the output detector 253. By taking the ratio of the outputs of the detectors 247 and 253 the wavelength change of the fiber grating sensor 217 may be determined and if the fiber grating filter 237 is collocated with the fiber grating sensor 217 and the fiber gratings 237 and 217 are thermally matched, temperature effects on the system can be greatly reduced. The beamsplitter 209 could be replaced by a optical circulator with one port of the circulator connected to the light source, the second port connected to the fiber grating sensor 217, the third port connected to the fiber 229.

An application where highly sensitive fiber grating strain sensors are needed involves the measurement of strain fields associated with cars and trucks passing over roadways or other paved surfaces. In particular existing systems based on piezoelectric devices are mounted near the surface of the road and damage associated with traffic near the surface results in their failure over periods of approximately one year. A fiber optic microbend based system was tried by the Oregon Department of Transportation that was mounted near the surface of the roadway and it lasted approximately two weeks before failure. Ideally the system should be sensitive enough that it could be embedded approximately 3 inches into the roadbed and have sufficiently high sensitivity to measure the position of truck axles for identification and speed determination. Accurate measurement of strain in the freeway also could be used to support weigh in motion systems. By burying the fiber sensors 3 inches into the freeway the concrete could wear down 2 inches at which point the surface would be scheduled for routine replacement and the sensors would be sufficiently deep to survive the process.

Figure 3:
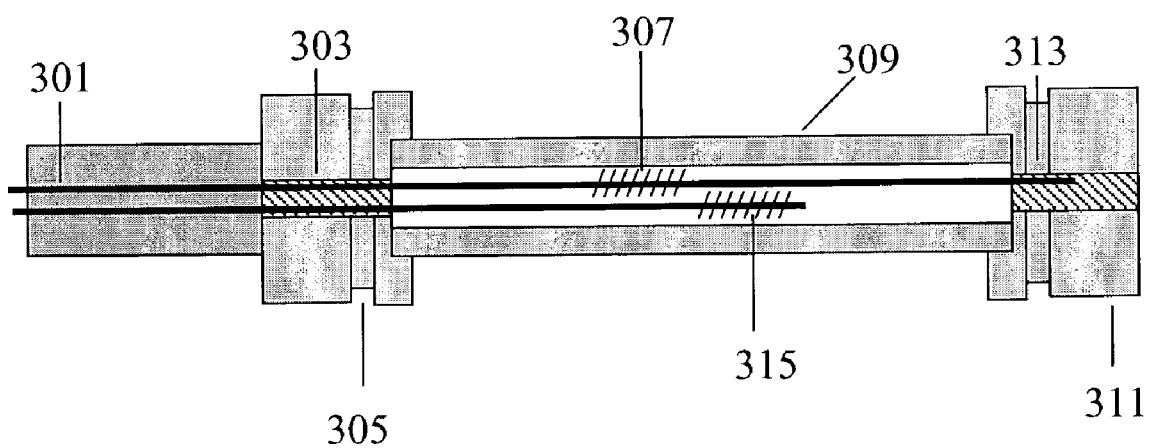
FIG. 3 is a diagram showing a prior art fiber grating strain sensor assembly with a fiber grating prestrained and anchored at both ends.

To support this application Blue Road Research used a design it had employed earlier with bridges shown in FIG. 3. An optical fiber 301 is cemented and or crimped in place at the location 303 of the anchor assembly 305 that is notched to accommodate anchoring in concrete of asphalt like materials such as hot sealant used in road construction. A fiber grating 307 is located in the optical fiber 301 and placed in a tube 309 that is attached to the anchor 303 and the anchor 311. The fiber 301 inside the tube 309 with the fiber grating 307 is prestrained and cemented and or crimped in the anchor 311 at the location 313. A second fiber grating 315 may be placed in the region of the tube and unstrained to measure temperature. When the fiber grating strain sensor is subject to flexing of the roadway or paved surface due to passage of a car or truck, the fiber grating 307 changes strain states and using the system shown in FIG. 1 or 2 the wavelength change may be read out at high speed.

Figure 4:
FIG. 4 is photo of a diamond saw being used to support installation of fiber grating strain and temperature sensors into the I 84 freeway near exit 14 in Oregon.
Figure 5:
FIG. 5 is a photo of a fiber grating strain sensor assembly being installed.
Figure 6:
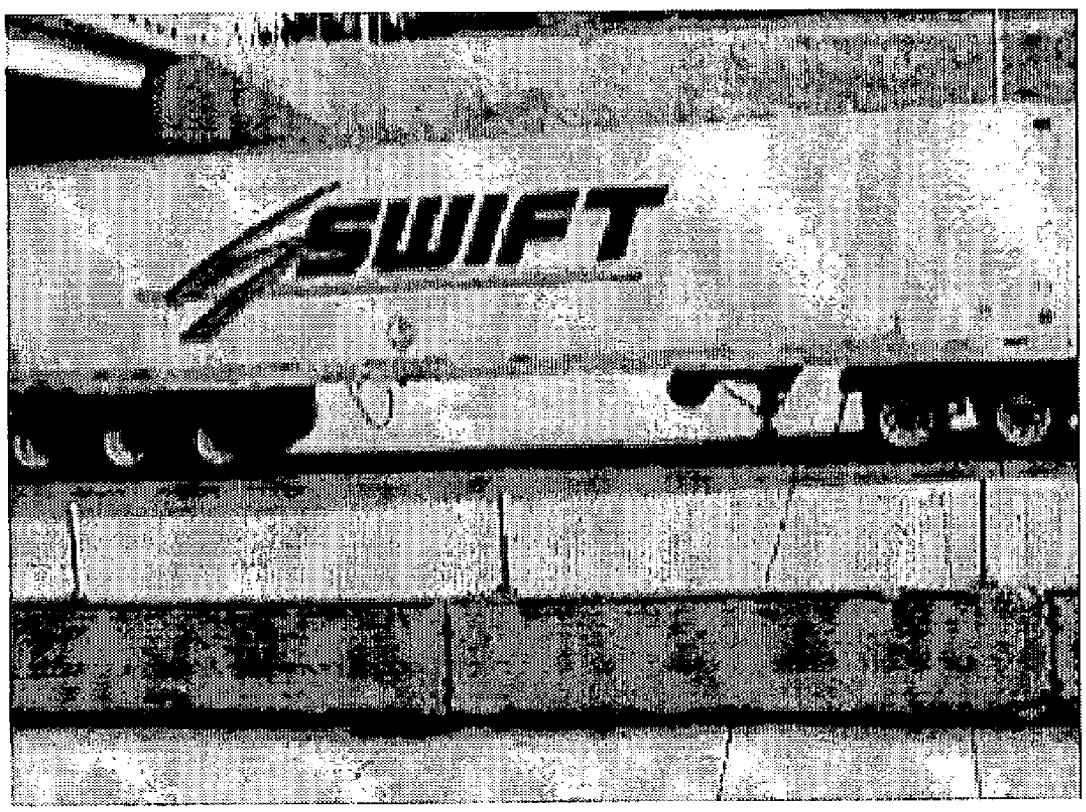
FIG. 6 is a photo of a semitrailer whose signature is being measured by fiber grating strain sensors installed on the I-84 freeway near exit 14 in Oregon.
Figure 7:
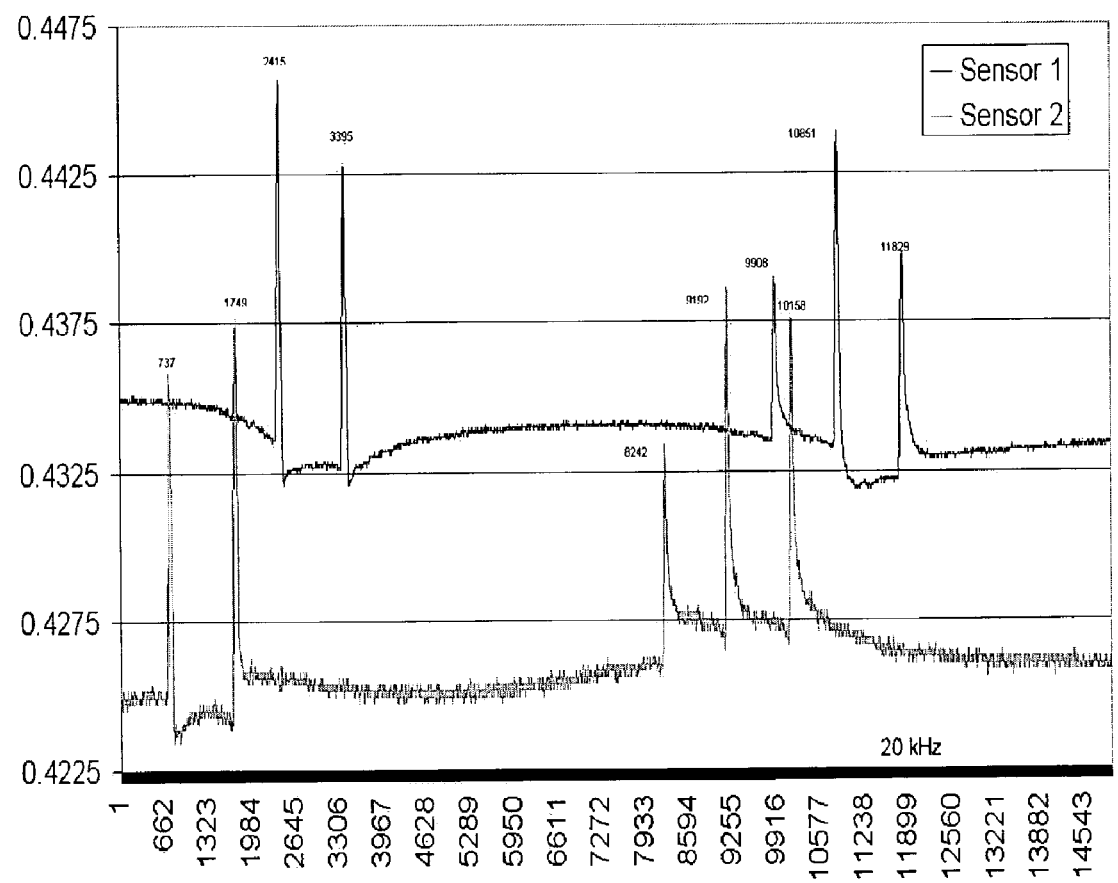
FIG. 7 is a plot of data recorded of two fiber grating strain sensors on the I-84 freeway near exit 14 in Oregon from the semitrailer shown in FIG. 6. The spike signals may be used to count axles and axle position to identify the type of truck. The position of the two sensors that are separated by approximately 7 feet may be used to record the truck speed at 57 miles per hour.

FIG. 4 shows a diamond blade cutter being used to cut 3 inch deep grooves on the I-84 freeway east of Portland, Oreg. near exit 14 in order to install a set of four fiber grating strain sensors similar to those shown in FIG. 3. FIG. 5 shows a sensor being installed in the I-84 freeway. FIG. 6 shows a semi trailer with two front axles and three back axles passing over the set of fiber grating strain sensors on the I-84 freeway. FIG. 7 shows the response of two of the sensors spaced by approximately 7 feet. The spikes corresponding to the two front axles and three back axles can clearly be seen on both of the fiber grating sensor outputs and used to identify the characteristics of a semitrailer passing. The time spacing between the arrival of the first axle on the sensors spaced by 7 feet can be used to determine the speed of the truck at 57 miles per hour.

Shortly after the fiber grating strain sensors of FIG. 3 were installed into the I-84 freeway it was determined that the anchor point attachment at 313 in anchor 311 of FIG. 3 broke due to unexpectedly high strain in the freeway due to heavily loaded trucks. The result is that the sensors were actually configured in a manner similar to that shown in FIG. 8. Here an optical fiber 401 is anchored by the block 403 at the location 405 via cement or a crimp. The fiber grating 407 is now floating loosely in the tube 409 without attachment to the anchor 411. It was found that the apparent friction of the tube on the fiber grating 407 lying along the inner surface of the tube 409 was sufficient to generate a large signal through the flexing action of the tube. This resulted in a fiber strain sensor that has survived without changes in performance for nearly two years in the I-84 freeway under continual exposure to traffic and weather. While this system works for identifying vehicles and the speed of traffic it is ultimately highly desirable to measure the weight of vehicles as well. Consequently a second set of fiber grating sensors were designed and installed in the I-84 freeway approximately one year after the first set. All of these sensors were installed successfully without failure. The following diagrams illustrate these designs and variants on them.

Figure 8:
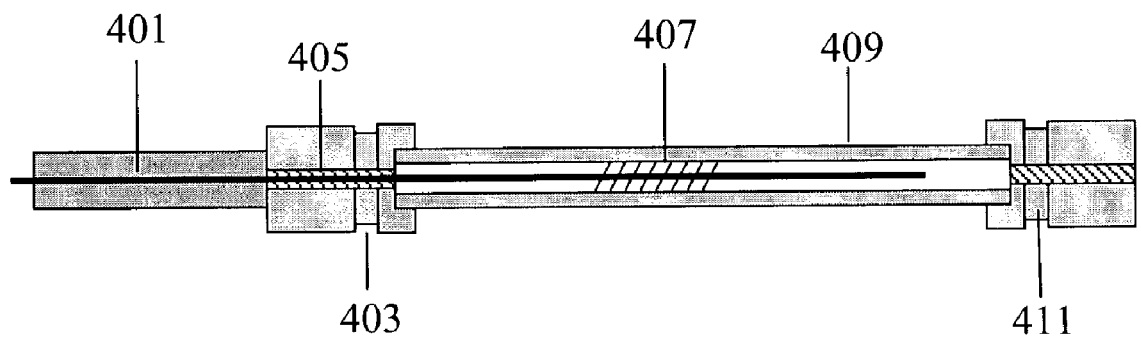
FIG. 8 is a diagram of a fiber grating strain sensor installed in the I-84 freeway with one end not attached. Strain signals are generated by motion of the sensing fiber due to friction on the flexing tube.
Figure 9:
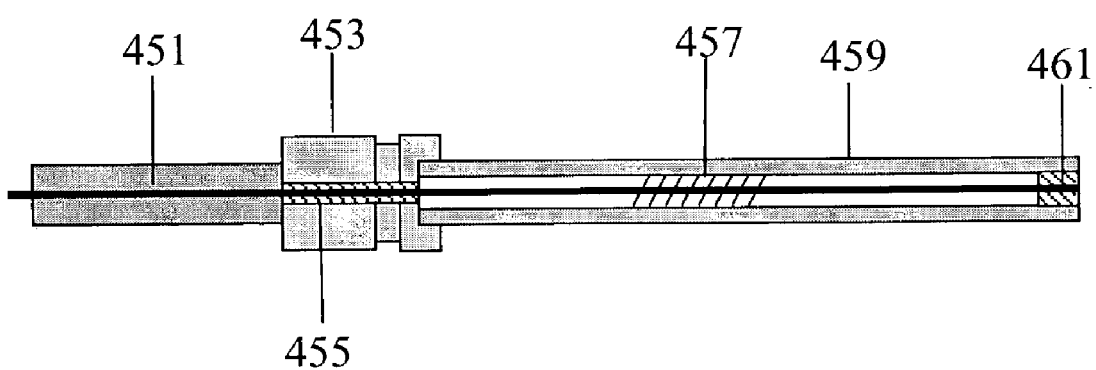
FIG. 9 is an illustration of a fiber grating strain sensor with one anchor point prestrained in a tube.

FIG. 9 shows a variation of the basic design in FIG. 8. Here the fiber 451 is anchored by the assembly 453 on one end by cementing in place and or crimping at location 455. The fiber grating 457 is prestrained in the tube 459 and potted in place at the end of the tube 461.

Figure 10:
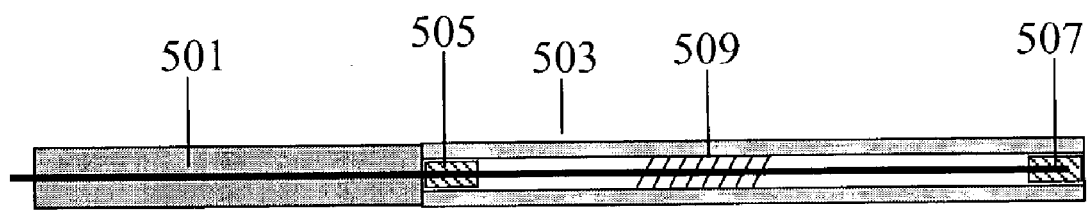
FIG. 10 is an illustration of a fiber grating strain sensor prestrained in a tube.

FIG. 10 shows the fiber 501 being cemented in the tube 503 at the locations 505 and 507 after the fiber grating sensor 509 is prestrained in the tube 503.

Figure 11:
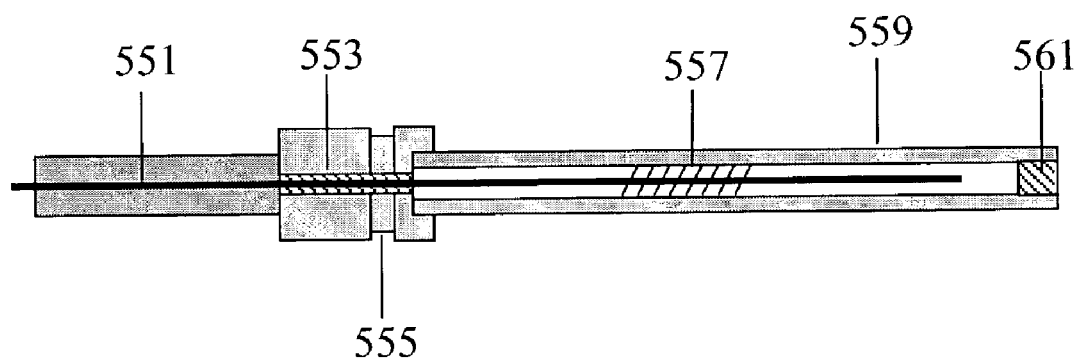
FIG. 11 is an illustration of a fiber grating strain sensor with one end loose in the tube and one anchor point.

FIG. 11 shows a variation on FIG. 8 where the fiber 551 is anchored at the location 553 by the anchor assembly 555. The fiber grating sensor 557 is placed in the tube 559 and sealed at the other end 561.

Figure 12:
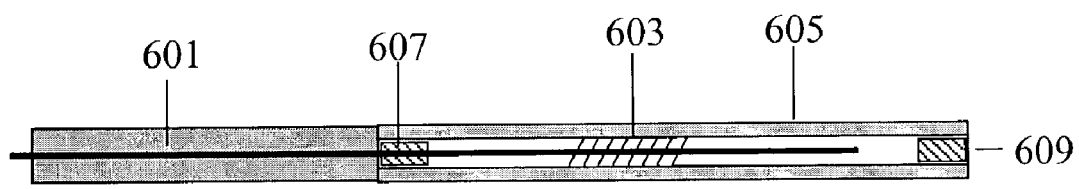
FIG. 12 is a diagram showing a fiber grating strain sensor with one end loose in a tube.

FIG. 12 shows a variation of FIG. 3 where the fiber 601 contains a fiber grating sensor 603 that is potted on one end of the tube 605 at the location 607 and the other end of the tube 605 is sealed at location 609.

Figure 13:
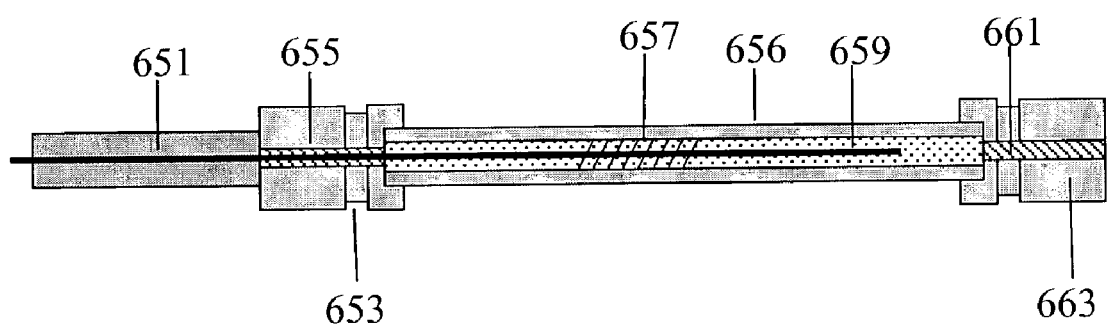
FIG. 13 is an illustration showing an assembly with two anchor points. The tube containing the fiber grating sensor has been filled with an adhesive or high viscosity material to insure good coupling between the flexing tube and fiber grating sensor. The fiber is attached at one end.

The sides of the tubes actually used in the I-84 freeway provided enough friction that strain was transferred from the tube to the fiber grating strain sensors. Slippage did however occur resulting in changes to the magnitude of the strain recorded by passage of traffic. Looking at FIG. 7 this can be seen as changes to the baseline of operation. One way to improve this situation is to apply an adhesive to the interior to the tubing or apply the adhesive to the fiber grating region before it is pulled into the region of the tube. Another alternative is to fill the tube with a viscous elastic material. FIG. 13 shows this type of configuration. A fiber 651 is anchored by cementing and or crimping by the anchor assembly 653 at the location 655. The tube 656 contains the fiber grating sensor 657 that is immersed in the fluid-like adhesive 659 which is sealed on the end 661 by the anchor assembly 663.

Figure 14:
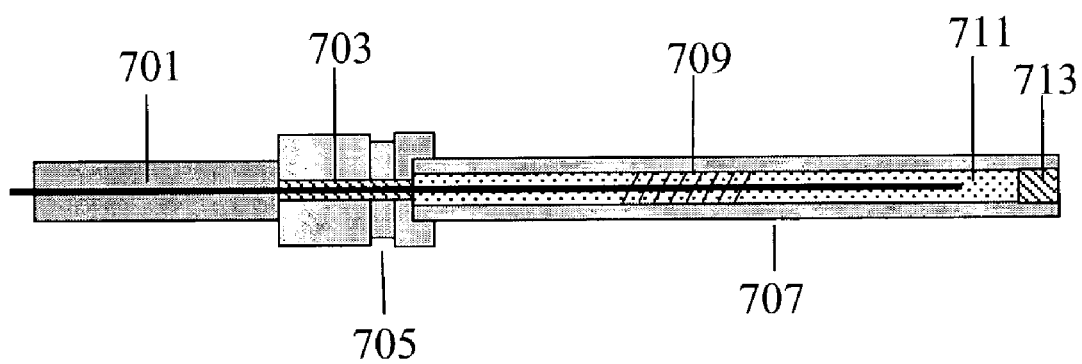
FIG. 14 is an illustration showing an assembly with one anchor point. The tube containing the fiber grating sensor has been filled with an adhesive or high viscosity material to insure good coupling between the flexing tube and fiber grating sensor. The fiber is attached at one end.

FIG. 14 shows an assembly similar to that of FIG. 13 without the second anchor assembly 663. Here the fiber 701 is anchored at the location 703 by the anchor assembly 705 and placed in the tube 707 that contains the fiber grating sensor 709 and the fluid like adhesive 711. The other end of the tube 707 is sealed at the other end of the tube 713.

Figure 15:
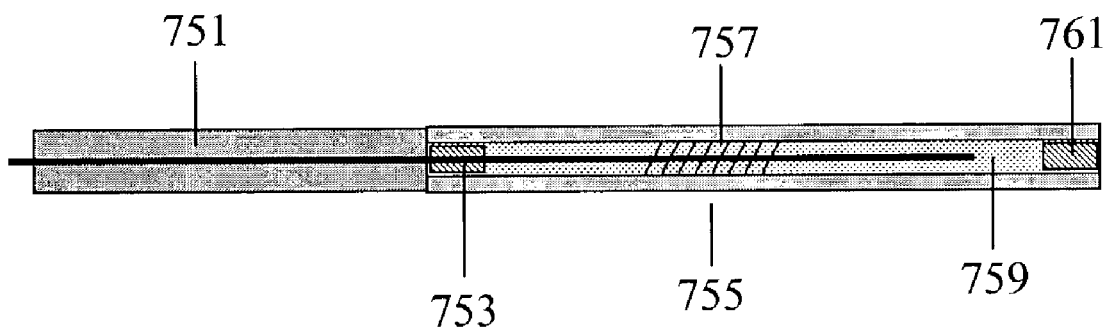
FIG. 15 is a diagram showing an assembly with a tube filled with an adhesive or high viscosity material to insure good coupling of the fiber optic strain sensor, which is attached at one end.

FIG. 15 shows an assembly where the optical fiber 751 is cemented in place at the location 753 in a tube 755. Interior to the tube 755 is a fiber grating sensor 757 in a fluid adhesive 759. The tube is sealed at the other end 761.

Figure 16:
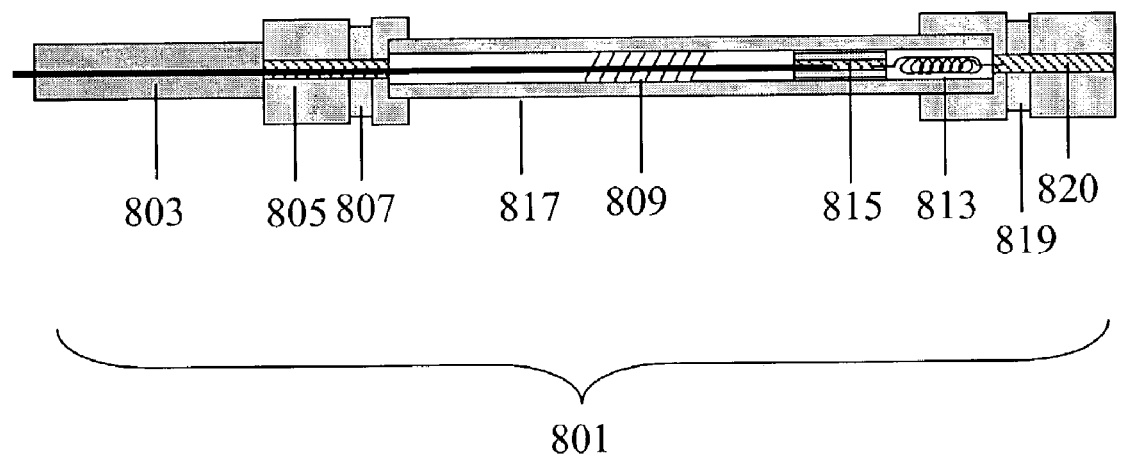
FIG. 16 is an illustration of a fiber grating strain sensor assembly with a fiber grating strain sensor anchored at one end and attached to a spring on the other. The assembly has two anchor points.

FIG. 16 shows a fiber grating strain sensor transducer 801 consisting of an optical fiber 803 that is cemented and or crimped in the location 805 of the anchor assembly 807. A fiber grating 809 is written into the optical fiber 803 which has an end attached to a spring 813 via the clamping end 815. This assembly is placed in the tube 817 that is in turn attached to the anchor assemblies 807 and 819. The other end of the spring 813 is preloaded and attached to the anchor assembly in the area 820. The advantage of the spring-loaded approach is that by appropriate choice of spring or spring like material replacing the spring (such as an elastic material) the loading on the fiber can be adjusted to optimize response for a variety of displacements.

Figure 17:
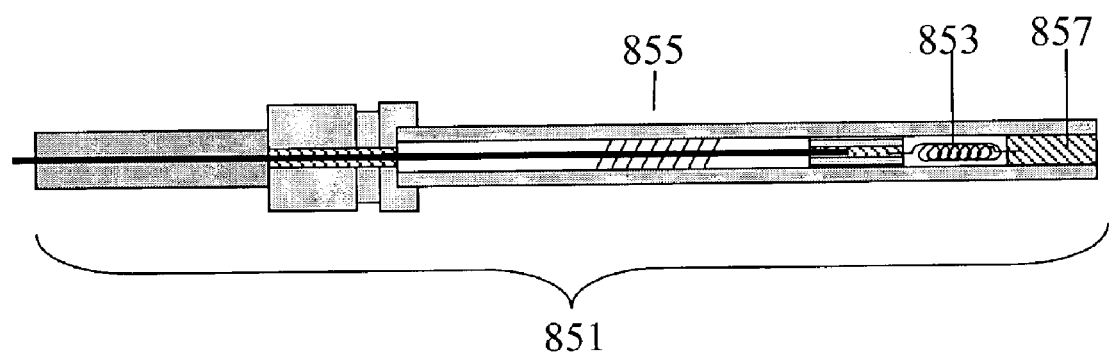
FIG. 17 is a diagram similar to FIG. 16 with one anchor point.

FIG. 17 shows an assembly 851 similar to FIG. 16 with the second end of the spring 853 anchored in the tube 855 in the location 857.

Figure 18:
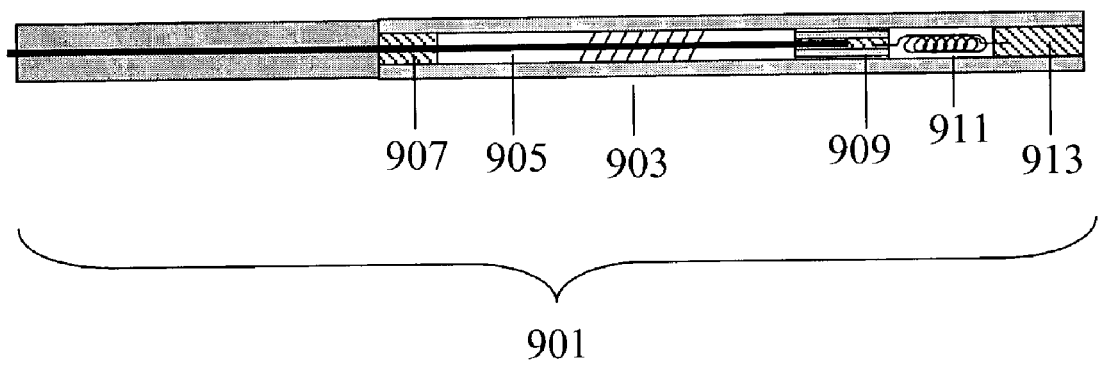
FIG. 18 is an illustration of a fiber grating strain sensor assembly with one end attached to the fixed end of the tube and the other to a spring assembly.

FIG. 18 shows an assembly 901 similar to FIG. 16 where the tube 903 anchors the one end of the optical fiber 905 at the location 907 and the other end of the optical fiber 905 is anchored at 909 attaching one end of the spring 911. The other end of the spring 911 is anchored in the tube at the point 913.

Figure 19:
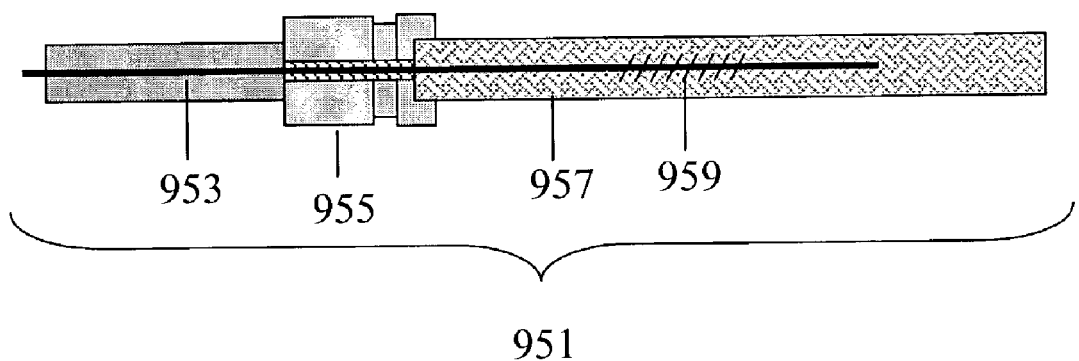
FIG. 19 is an illustration of a fiber grating strain sensor assembly with one anchor point and the fiber grating strain sensor attached to or embedded into a beam that may be composite.

An alternative approach to placement of the fiber grating sensors into a tube involves embedding them into composite beams. This was done on some of the fiber grating sensors embedded into the I-84 freeway. FIG. 19 shows one type of transducer 951 of this type. An optical fiber 953 is placed into a connection assembly 955, which acts an interface and buffer to the composite beam 957 that has a fiber grating sensor 959 attached to it. There are three different methods for attaching the fiber grating sensor. The first is to use an adhesive to bond it to the surface. The second is to cut a groove into the composite and place the fiber containing the fiber grating 959 into the groove, which may then be filled with epoxy or another suitable filler material. The third is to embed the fiber grating into the composite part either directly into its layers or by bonding overlay material on top of it. The fourth method is to embed or attach a fiber grating prestrained in a tube to the beam, which may be a composite beam. The choice of method used depends on the type of installation on which it is used. Embedding it into the composite part or using the groove techniques provides the most protection when installation conditions are severe, handling may be rough and installation time short such as on an operating freeway where minimizing lane closure is important.

Figure 20:
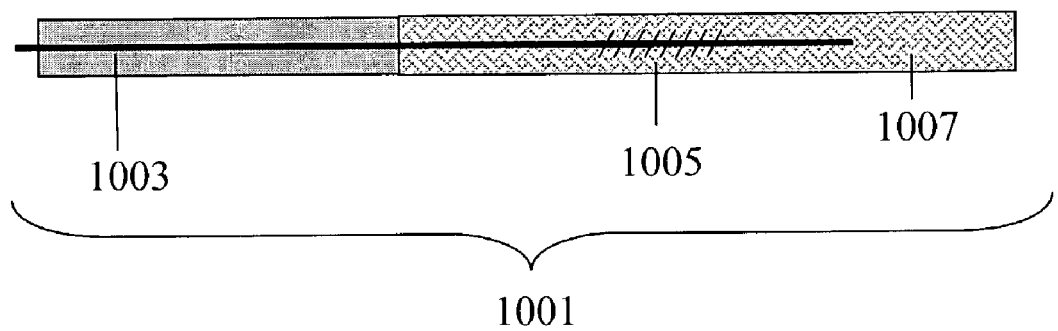
FIG. 20 is a diagram without an anchor point where the fiber lead is integrated into one end of the beam structure. The fiber grating strain sensor is attached to or embedded in the beam that may be composite.

FIG. 20 illustrates a composite beam transducer 1001 where the optical fiber 1003 containing the fiber grating sensor 1005 is attached or embedded directly into the composite beam 1007.

If only relative displacements are to be measured which would be the case for applications like traffic counting, vehicle identification and speed control, then high sensitivity, high speed read out units that are not temperature controlled can be used. For read out units similar to that shown in FIG. 1 where a fiber grating filter with narrow bandwidth may be used for high sensitivity the fiber grating sensor may have thermally induced wavelength shift that detune the system from optimal response. This can be compensated for by tuning the fiber grating filter mechanically. This can be done by axially stretching the optical fiber or using a bending beam approach such as that described by Schulz and Udd in U.S. patent application Ser. No. 09/746,037 so that the position of the fiber grating filter is optimized. One issue with this approach is that it requires active thermal compensation that may require additional power to drive a mechanical mechanism such as a stepper motor.

An alternative approach is to use the configuration of FIG. 2 where matched filters that may be fiber gratings are placed without strain or at reduced strain in the transducer assemblies of FIGS. 8 through 20. Since the fiber grating filter is in the same assembly there is passive thermal matching. Partial strain isolation may be achieved by assuring the fiber is loose in the assembly, a second step would be to coat the fiber with a friction reducing lubricant or float the fiber in a low viscosity material.

Figure 21:
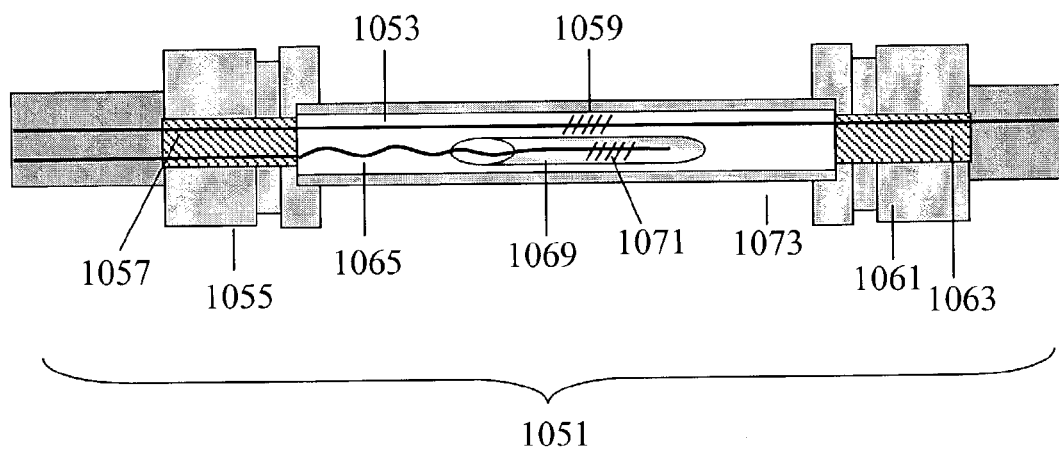
FIG. 21 is a diagram showing a fiber grating strain sensor assembly with features similar to FIGS. 8 through 20 where a second fiber grating filter is installed and isolated from strain by a tube that is coated or filled with low viscosity material to minimize friction to the fiber grating filter as the tube assembly flexes.

FIG. 21 illustrates the passive thermal compensation approach with a fiber grating sensor matched to a fiber grating filter placed in essentially the same thermal environment. The transducer 1051 consists of an optical fiber 1053 that is cemented or crimped at the anchor 1055 at the end 1057. The fiber grating 1059 is placed under tension and the second end of the fiber 1053 cemented or crimped to the second anchor 1061 at the location 1063. The fiber is placed under tension so that it can respond to both tension and compression loads. A second fiber 1065 passes through the anchor 1055 and strain isolated such as in a tube 1069 that encloses the fiber grating filter 1071. The tube 1069 is designed so that friction is minimized between the fiber grating 1071 and the interior of the tube 1069. Using lubricants such as silicon oil could do this. Also the exterior to the tube 1069 could be lubricated to minimize friction between it and the protective tube 1073 that is in turn attached to the anchors 1055 and 1061. The end result would be to provide a means to doubly isolate the fiber grating filter 1071 from motions of the tube 1073.

Figure 22:
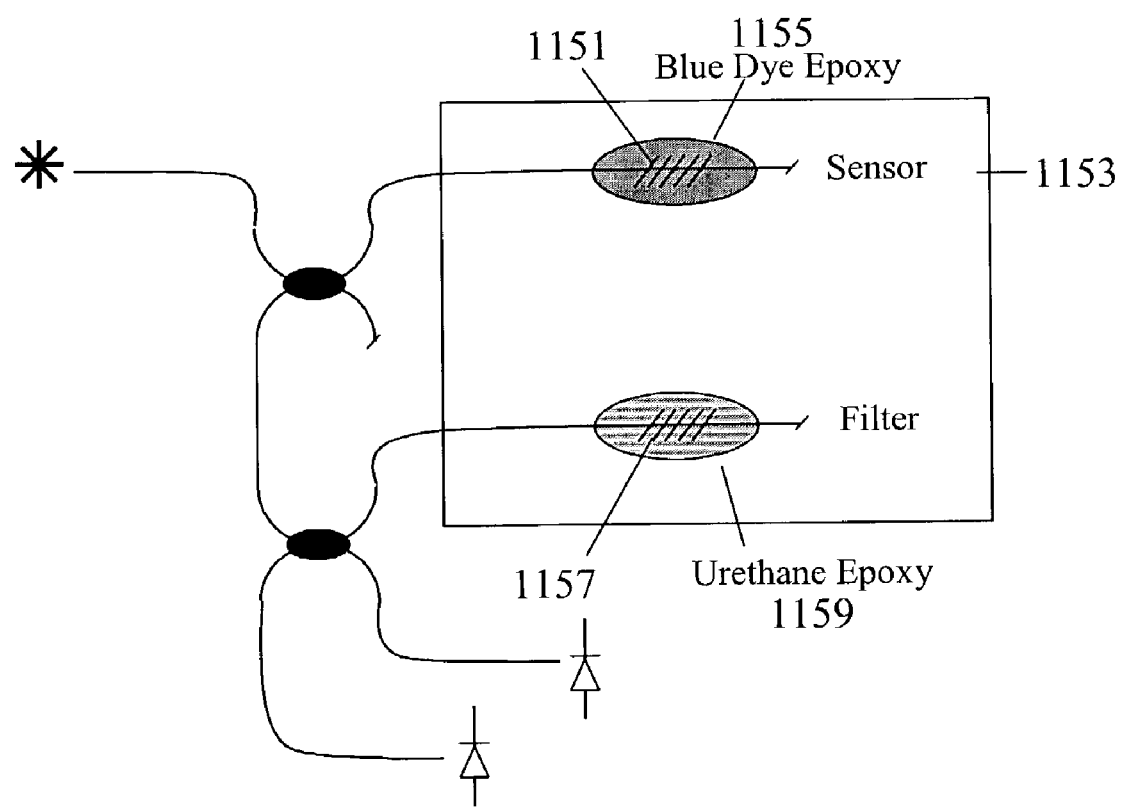
FIG. 22 is an illustration of a vibration sensor that is configured to sense higher frequency vibrations and filter lower frequency vibrations by having the fiber grating sensor attached with a hard material and the fiber grating filter attached with a softer material.
Figure 23:
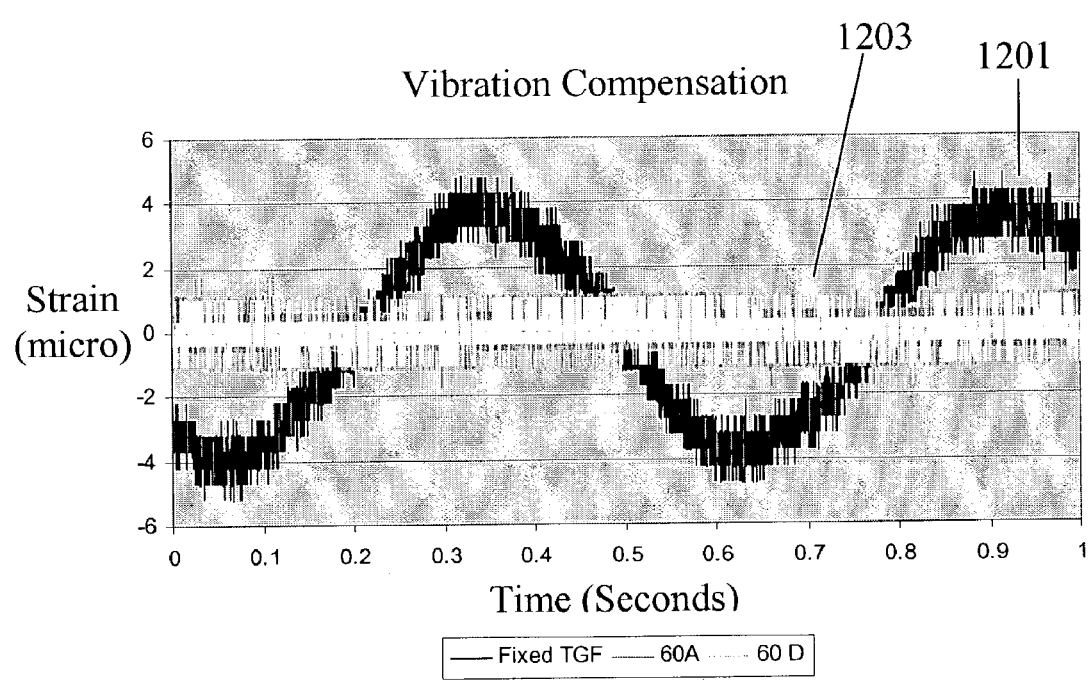
FIG. 23 is a graph showing the response of the fiber grating strain sensor attached via hard material onto the plate filtered through a stationary fiber grating filter not on the plate versus the relative response of the hard and soft material fiber grating sensor/filter pair on the plate.
Figure 24:
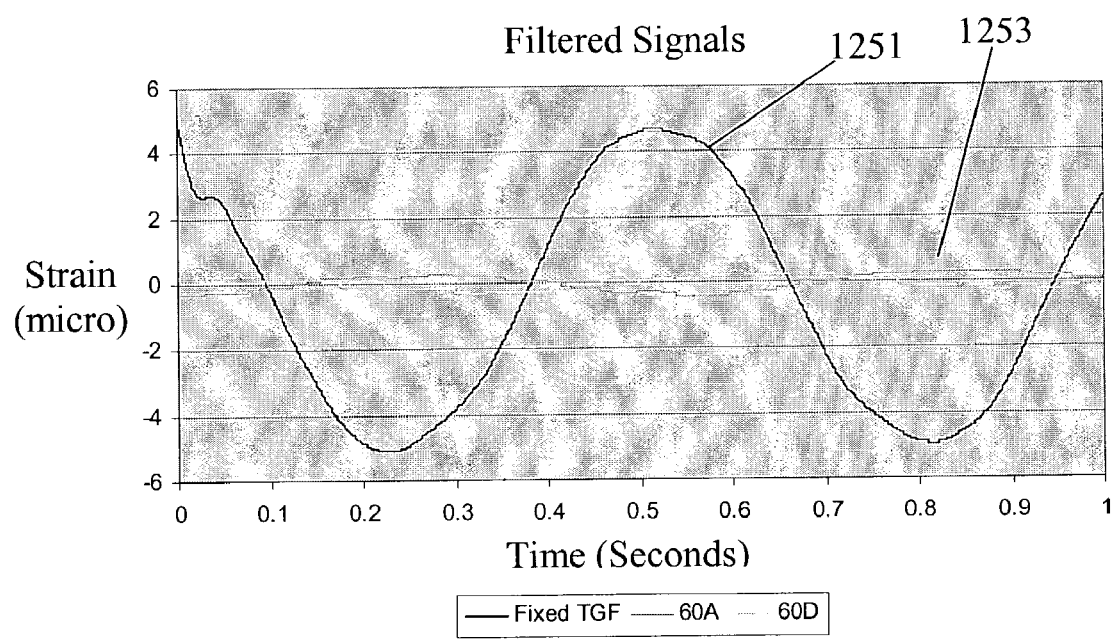
FIG. 24 is a graph similar to FIG. 23 that has been filtered to suppress high frequency noise. It shows a reduction of low frequency vibration sensitivity of approximately a factor of 30.
Figure 25:
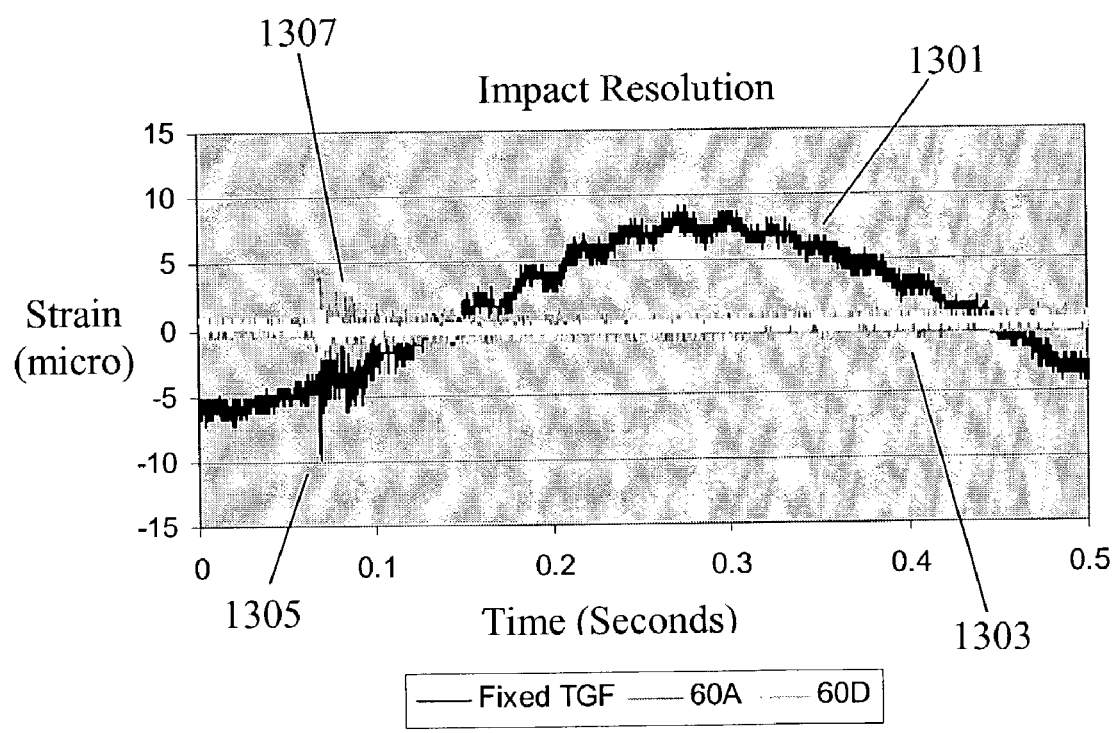
FIG. 25 shows the response to an impact is similar for both the hard material bonded fiber grating sensor on the plate filtered by a fiber grating filter off the plate and the low frequency vibration suppression system.

Controlling the relative coupling of the differential readout approach to strain can be used to damp out selective frequencies of vibration as well as reduce thermal effects. FIG. 22 illustrates how this can be done using the basic configuration described in detail in association with FIG. 2. In FIG. 22 the fiber grating sensor 1151 is bonded to an aluminum plate 1153 with a hard epoxy such as the commercial blue dye epoxy 1155 associated with fabrication of fiber connectors. The fiber grating filter 1157 is attached to the aluminum plate 1153 with the relatively soft urethane epoxy 1159. The aluminum plates was then subject to low frequency vibration and results compared for the output of the fiber grating sensor 1151 when it was hooked up to a readout unit with a fiber grating filter external to the plate curve 1201 of FIG. 23 and using the fiber grating filter 1157 placed in the urethane epoxy, curve 1203. The system detectors were set up for 10 kHz operation. FIG. 24 shows the same signals filtered to 100 Hz. The curve 1251 corresponds to the fiber grating filter 1157 being external to the aluminum plate 1153 and curve 1253 corresponds to the fiber grating filter 1157 being bonded with the urethane epoxy 1159 to the aluminum plate 1153. Note that there is nearly a factor of 30 reduction in low frequency vibration sensitivity. FIG. 25 shows the result when the aluminum plate 1153 is struck with an impact. The curve 1301 corresponds to the externally located fiber grating filter 1157 and the curve 1303 corresponds to the fiber grating filter 1157 located on the aluminum plate 1153. When an impact occurs the effect can be seen in the region of 1305 for curve 1301 and region 1307 for curve 1303. The magnitude of the impact signal in both cases is approximately equal.

Figure 26:
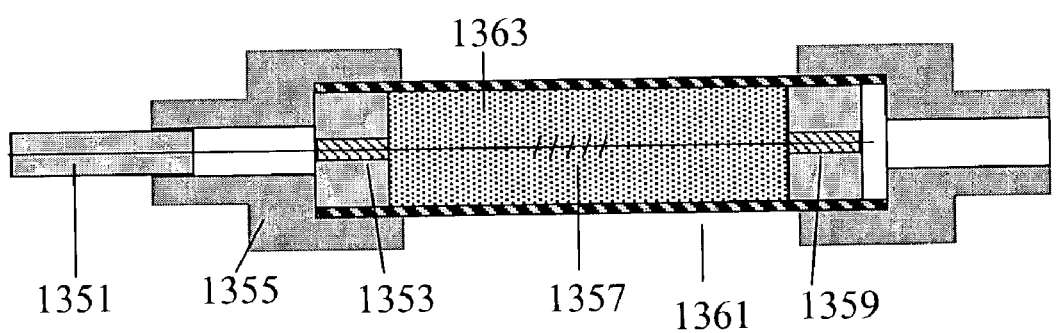
FIG. 26 is a diagram of a moisture/humidity sensor where a fiber grating strain sensor responds to strain induced by swelling of foam encased in a tube.
Figure 27:
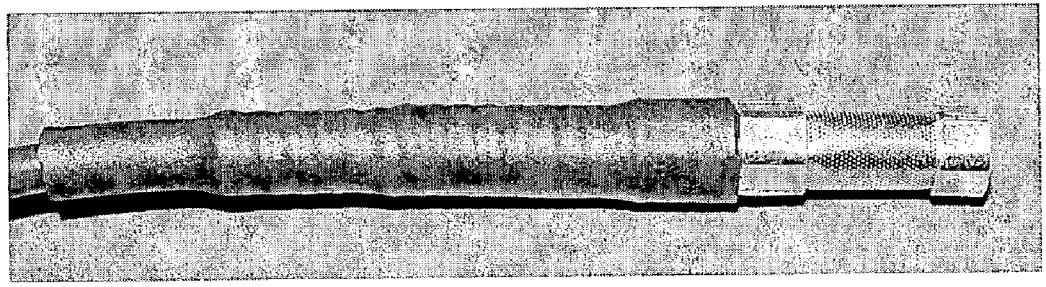
FIG. 27 is a photo of a moisture/humidity sensor constructed according to the diagram of FIG. 26.
Figure 28:
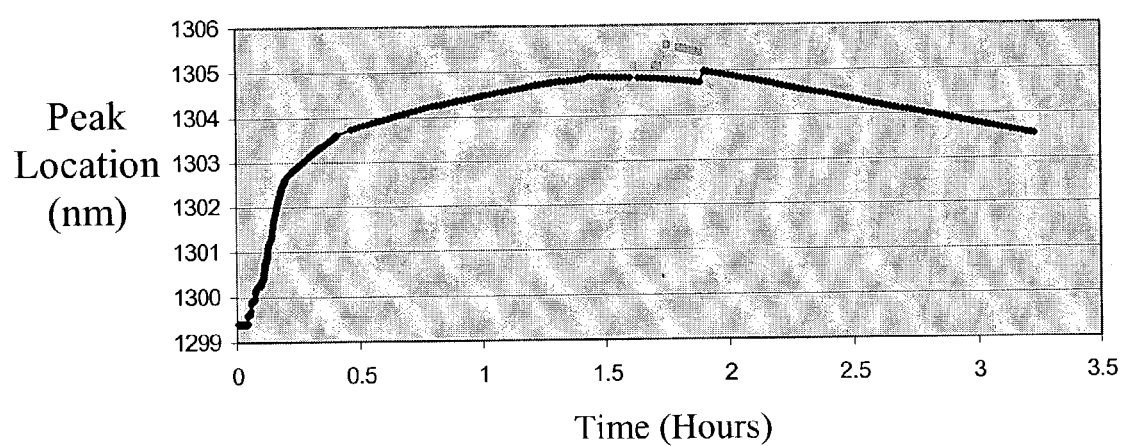
FIG. 28 is a graph of the moisture sensor of FIG. 27 being exposed to water.
Figure 29:
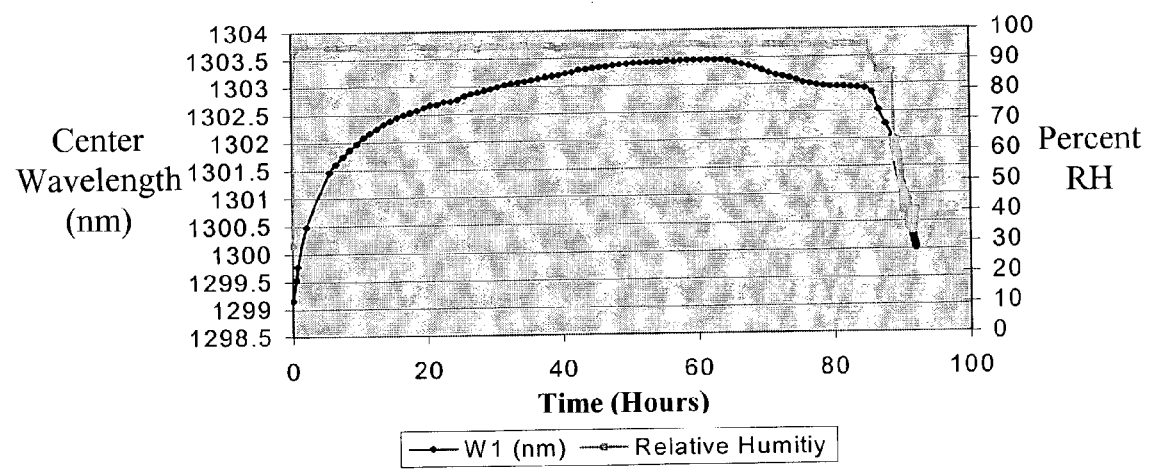
FIG. 29 is a graph of the moisture sensor of FIG. 27 being exposed to changes in relative humidity.

Another application example of configuring a fiber grating sensor transducer that may include a readout system similar to that of FIGS. 1 and 2 involves the detection of humidity and moisture content. FIG. 26 illustrates a basic configuration. An optical fiber 1351 is cemented or crimped on one end 1353 of an anchor 1355. A fiber grating sensor 1357 is stretched between the points 1353 and 1359 under tension. A porous tube or spring assembly 1361 contains a material 1363 that expands in the presence of water. The expansion of the material 1363 cause the tube 1361 to be stretched axially which in turn stretches the fiber grating sensor 1357. FIG. 27 shows a transducer built according the design of FIG. 26 where the material used is medical grade polyurethane foam that expands approximately 160% in the presence of water. FIG. 28 shows the response when this sensor is placed in water while FIG. 29 shows its response to relative humidity. A notable feature of the transducer shown in FIG. 28 is that it has a very large response in terms of wavelength shift greatly reducing requirements on a read out unit. For this type of moisture/humidity sensor a very broadband filter that is thermally stabilized such as a chirped fiber grating on mounted on thermally compensated ceramic in a configuration similar to FIG. 1 is adequate.

The accuracy of the sensor described in association with FIGS. 26 through 28 is fairly low and the time of response is long so it is more suitable for applications that determine the presence of water than absolute humidity measurements.

Figure 30:
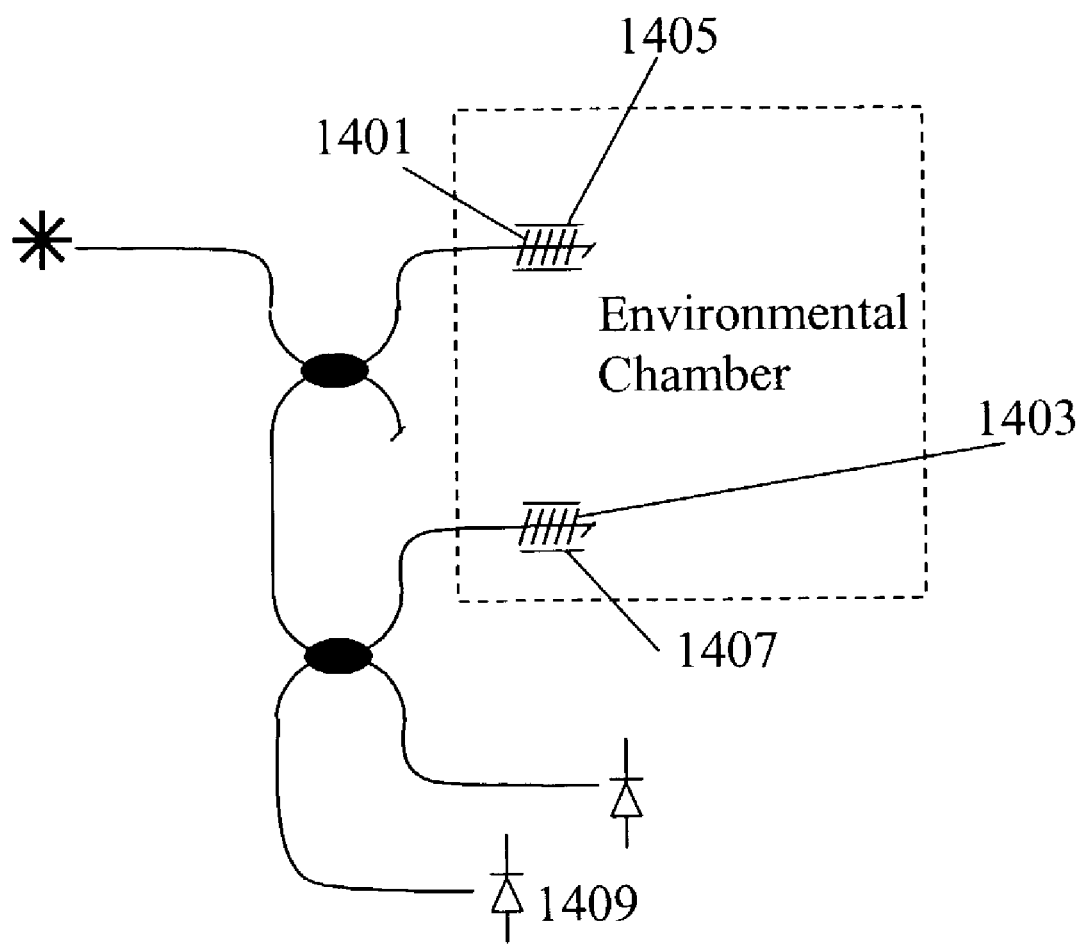
FIG. 30 is a diagram showing a fiber grating humidity sensor with high sensitivity and good thermal compensation by using a fiber grating sensor with a coating responsive to humidity and temperature and a matched fiber grating filter with a coating that responds closely to temperature only.
Figure 31:
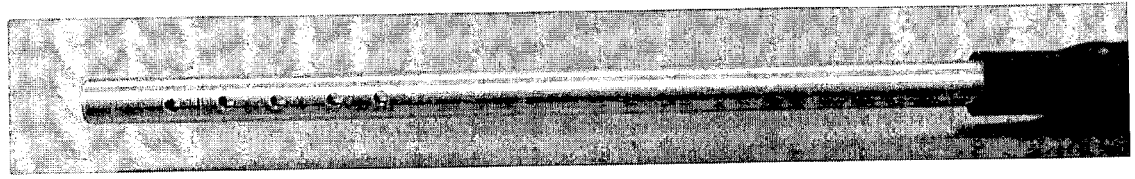
FIG. 31 is a photo of a sensor constructed according to FIG. 30.
Figure 32:
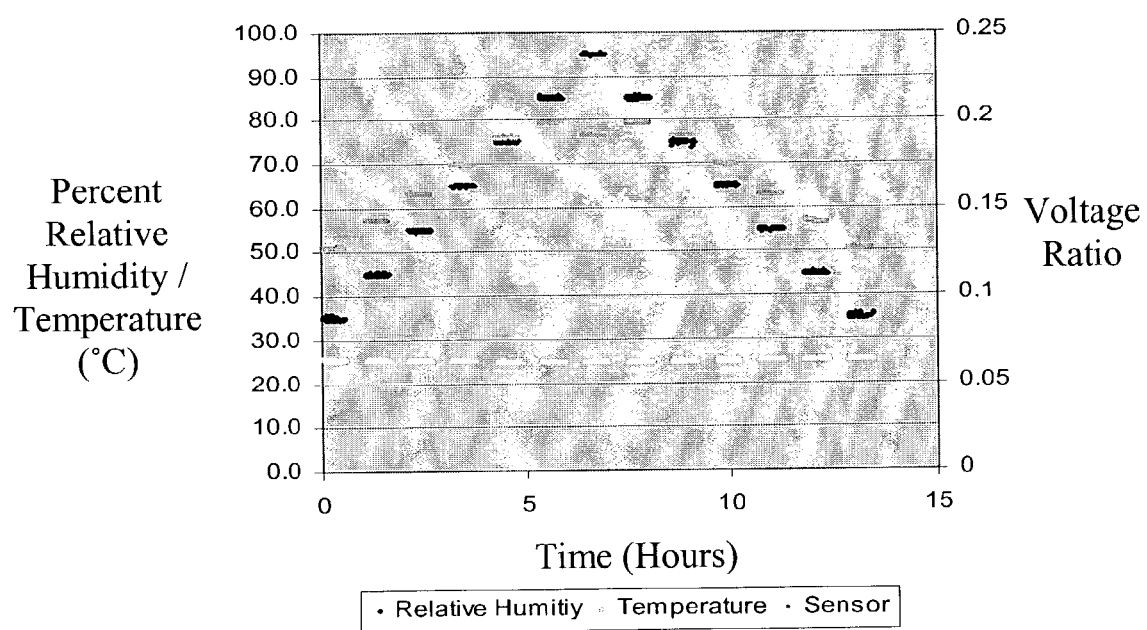
FIG. 32 is a graph showing the relative humidity response of the sensor of FIG. 30 compared to that of an electrical humidity sensor.

To accomplish the latter the configuration shown in FIG. 30 has been used successfully. A basic configuration similar to that described in FIG. 2 is used. The fiber grating sensor 1401 is matched to a fiber grating filter 1403. The two gratings are slightly offset in wavelength so that small relative changes in wavelength result in large net amplitude changes on the output detector 1409. In order to sense humidity the fiber grating sensor 1401 is coated with a material 1405 that expands and contracts with relative humidity, this material may be polyimide. The fiber grating filter 1403 is coated with a material 1407 that is relatively insensitive to humidity but responds in a manner similar to the fiber grating sensor 1401/coating 1405. The material 1407 could be an epoxy acrylate that has similar thermal response to polyimide but is relatively insensitive to humidity. FIG. 31 shows a photograph of a humidity sensor package where the fiber grating sensor 1401 with a polyimide coating is placed in close proximity to the fiber grating filter 1403 with an epoxy acrylate coating. FIG. 32 shows a comparison between the fiber grating relative humidity sensor designed according to the block diagram of FIG. 30 compared to an electrical sensor. From approximately 20 to 80 percent relative humidity the responses are within about 2% of each other. The discrepancies are believed to be due at least in part to nonuniformities in the polyimide coating on the fiber grating sensor.

Figure 33:
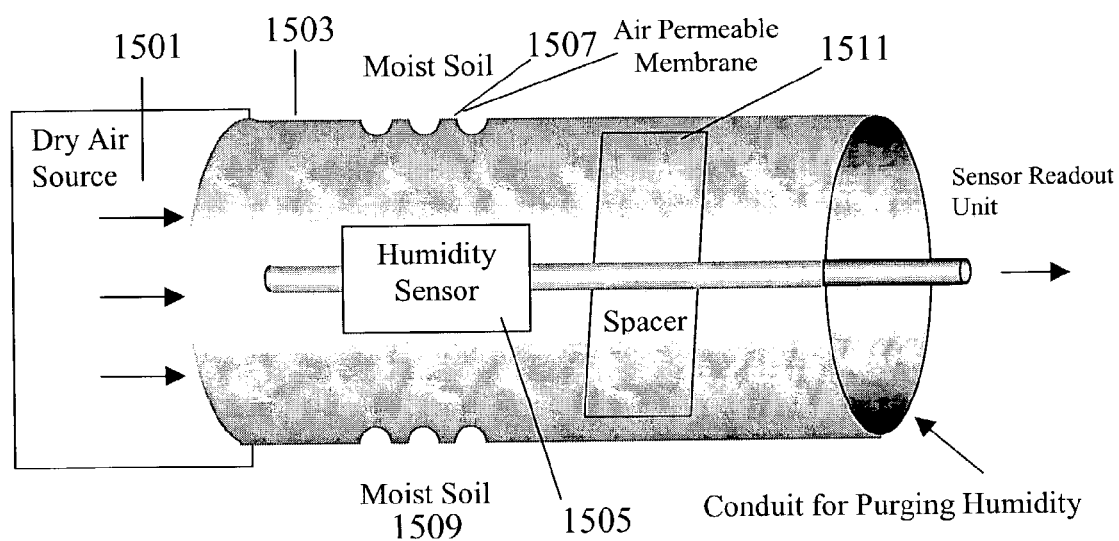
FIG. 33 is a diagram showing a moisture content sensor using a dry air purge.

Another case of interest for water measurement is the percentage of water in soil. The humidity sensor that relies on a coating will saturate with water condensation on the coating. In the case of soils tested by Blue Road Research, this occurs at about 4% water content. Since it is desirable to be able to measure higher percentages, other approaches are needed. FIG. 33 shows a system that is being used to measure these higher percentages of moisture. A dry air source 1501 is used to pump air into a tube 1503 with humidity sensors 1505 spaced along the length of the tube 1503 in locations adjacent to air permeable membranes 1507. When the dry air is used to purge the tube the sensors and tube are dried. After the purging has stopped the evaporating moisture from the soil 1509 causes a rise in humidity in the tube 1503 over time. A spacer 1511 is used to hold the humidity sensor 1505 in a fixed position in the tube 1503. The rate of the rise in relative humidity can be used to gage the percentage of moisture content in the soil 1509.

Figure 34:
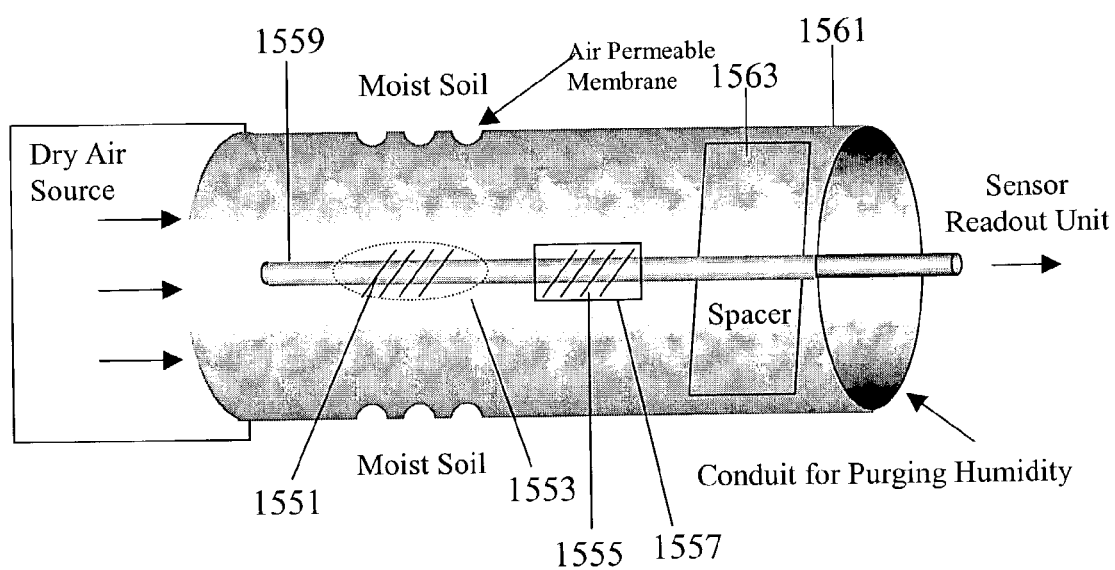
FIG. 34 is a fiber grating moisture content sensor where the fiber grating sensor and fiber grating filter are in a single fiber.

FIG. 34 shows the case where the humidity sensor 1505 consists of a fiber grating sensor 1551 that is responsive to humidity and temperature via a coating 1553 that may be polyimide and in the same optical fiber 1559 a second fiber grating sensor 1555 that is responsive primarily to temperature via the action of the coating 1557 that may be epoxy acrylate. The fiber 1559 is held in a fixed position in the tube 1561 by the spacer 1563. The actions of the sensors 1551 and 1555 are compared in wavelength to enable a temperature insensitive measurement.

Figure 35:
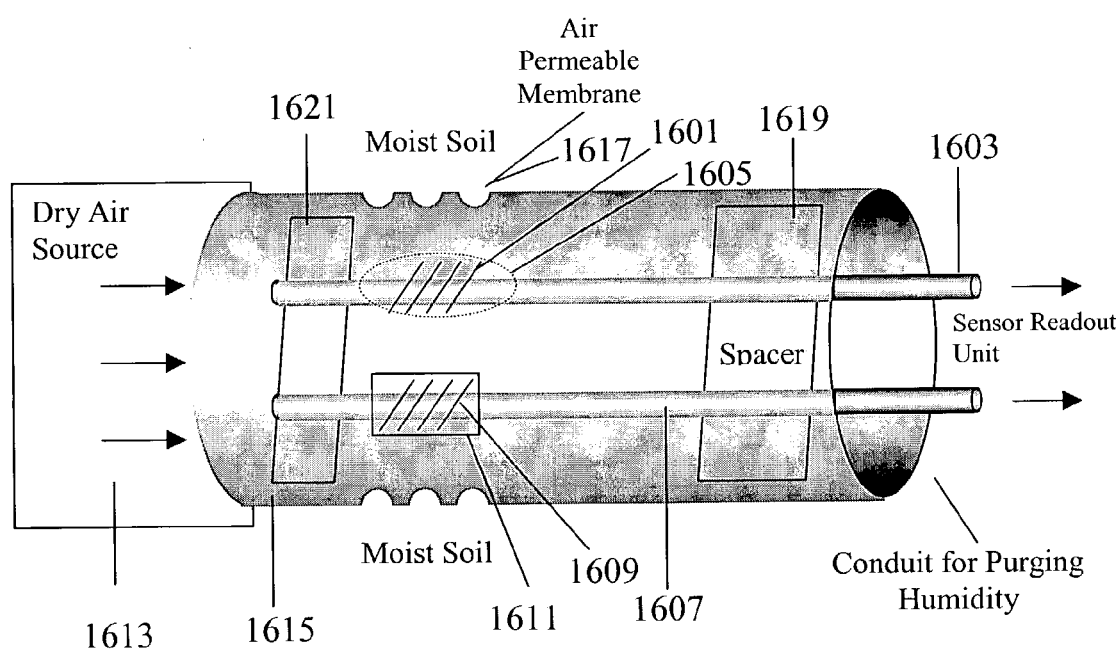
FIG. 35 is a diagram of a fiber grating moisture sensor where the fiber grating sensor and fiber grating filter are in separate fibers and the two are placed in close physical proximity.

FIG. 35 shows an alternative configuration where a fiber grating sensor 1601 is placed in the optical fiber 1603 and coated with a material 1605 sensitive to humidity changes that may be polyimide. A second fiber 1607 contains a second fiber grating sensor 1609 is placed in close proximity to the fiber grating sensor 1601. The fiber grating sensor 1609 has a coating 1611 that has a temperature response similar to that of the coating 1605 but has minimal humidity response that may be epoxy acrylate. The operation of the system is similar to that described in association with FIG. 33. A dry air source 1613 is used to flow dry air through the tube 1615 and out the free open end drying the sensors. When the air flow stops water evaporates into the tube 1615 through a permeable membrane 1617 that is located in the vicinity of the fiber grating sensors 1601 and 1609. The relative humidity in the tube 1615 is increased and response of the sensors 1601 and 1609 is a function of the soil moisture content. Spacing elements 1619 and 1621 are used to hold the optical fibers 1603 and 1607 in a fixed position in the tube. The readout of the humidity sensor of FIG. 35 may be performed by virtually any appropriate wavelength measurement device including optical spectrometers, scanning etalons or the readout approach described in association with FIG. 2. The output of the fiber grating sensor 1601 that depends on both humidity and temperature due to its coating 1605 can be compensated by the similar fiber grating sensor 1609 whose coating 1611 depends very nearly only on temperature.

Figure 36:
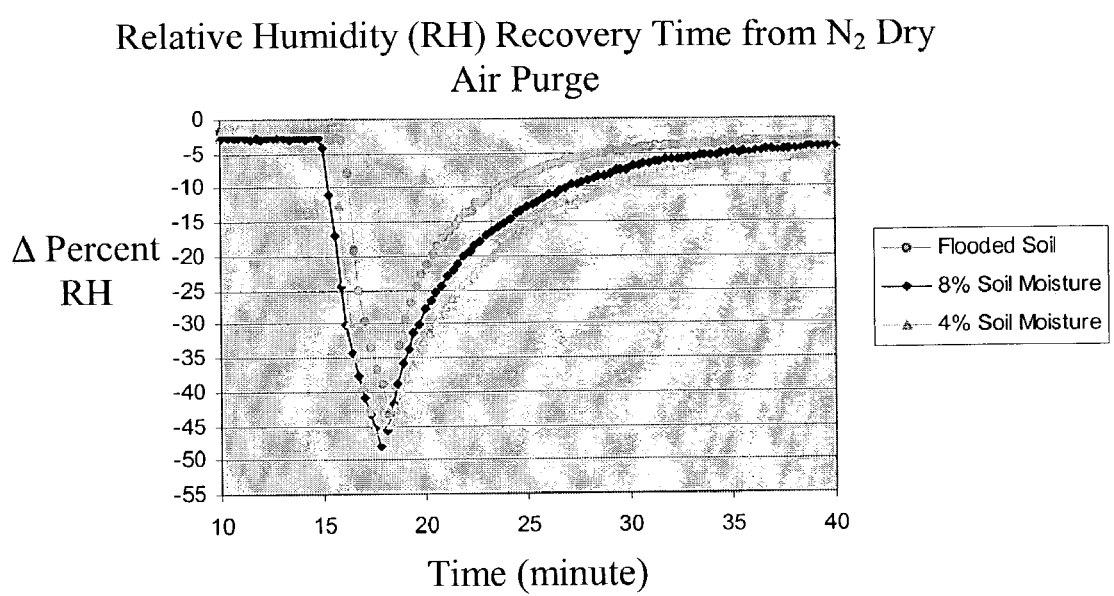
FIG. 36 is a graph illustrating the ability of a fiber grating moisture sensor constructed according to FIG. 35 to measure moisture content associated with 4% and 8% soil moisture content as well as soil flooding.

FIG. 36 shows the output of a sensor constructed according to FIG. 35 when placed in soil with content of 4% and 8% moisture as well as the case where the soil is flooded. The sensor is air purged during each run causing the falling slopes seen in FIG. 36. The rising slopes of humidity vary clearly depending on water content allowing the percentage of moisture in the soil to be determined.

The fiber grating transducers that have been described earlier in this patent can all be multiplexed and read out using such methods as wavelength; time division and spatial multiplexing and the wavelength measured using standard readout units. However in many cases higher speed, and or sensitivity may be required. The read out approach of FIG. 2 can operate at speeds up to GHz, although for practical reasons associated with mechanical resonance's of optical fiber, rates that exceed 10 s of MHz would be unlikely to be used. The approach also allows closely matched fiber gratings with steep spectral slopes to be used; enabling high sensitivity and appropriate matching and location achieve thermal compensation.

Figure 37:
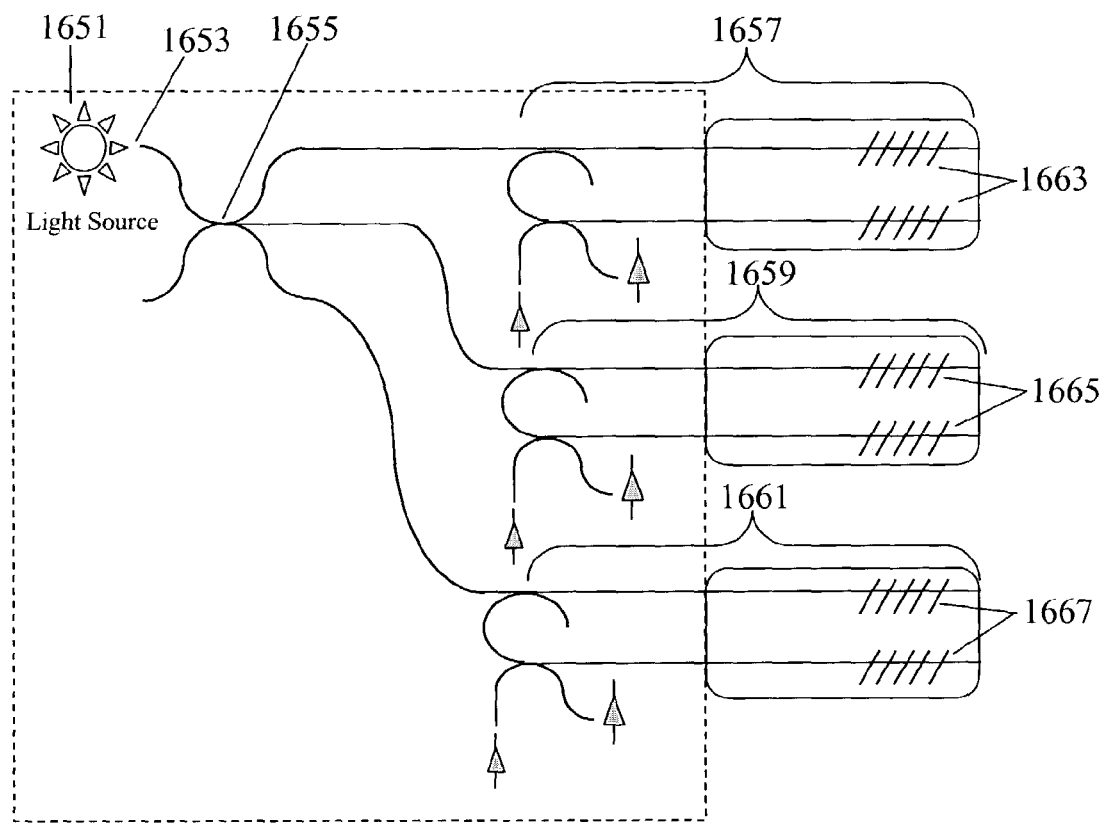
FIG. 37 is a diagram illustrating means to spatially multiplex the system shown in FIG. 2.

FIG. 37 shows a means of using spatial multiplexing with the configuration associated with FIG. 2. Here a light source 1651 that may be a fiber light source, a superradiant diode or a light emitting diode couples into the end 1653 of a multi-output port coupler 1655. The coupler 1655 could have N output ports although in the case of FIG. 37 it has three. The three outputs support a series of sensor readout combinations 1657, 1659 and 1661 that act in a manner analogous to the system described in FIG. 2. The fiber grating sensor pairs can be placed so that they measure a variety of environmental effects including high speed strain in a roadway or paved surface or moisture content in soil. One fiber grating sensor could be optimized for the desired environmental effect plus temperature while the function of the other fiber grating sensor could be used for temperature compensation.

Figure 38:
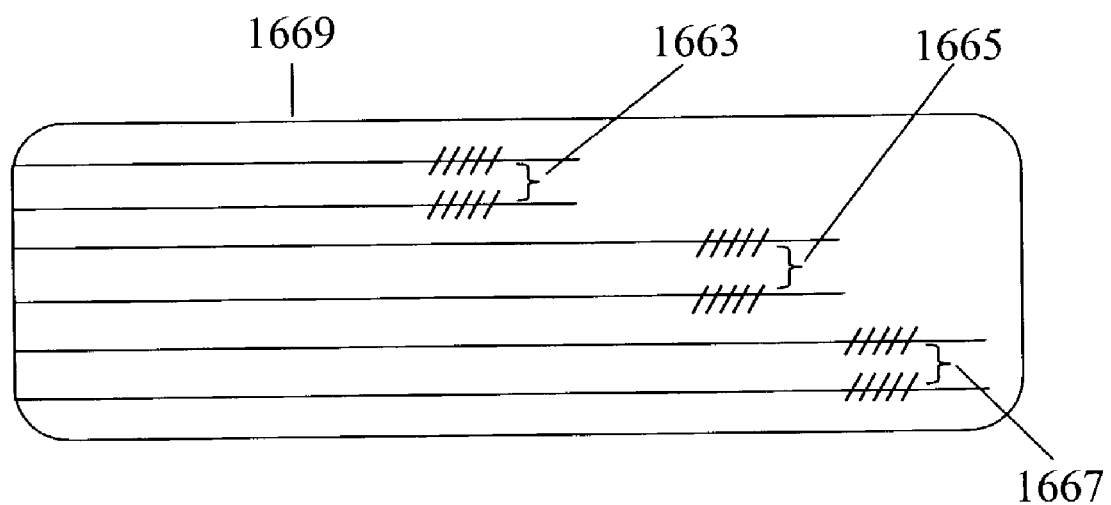
FIG. 38 is a diagram showing how the spatial multiplexing system of FIG. 37 may be used in a cable to space sensors along a single line.

FIG. 38 shows how the sensor pairs 1663, 1665 and 1667 could be arranged in a single cable assembly 1669 so that they sense environmental effects at specific locations along a cable. Since the fibers used are quite small having large numbers of fibers in a single fiber cable is quite practical for many applications. The very low cost of optical fiber can make this an attractive economic alternative for certain applications.

Figure 39:
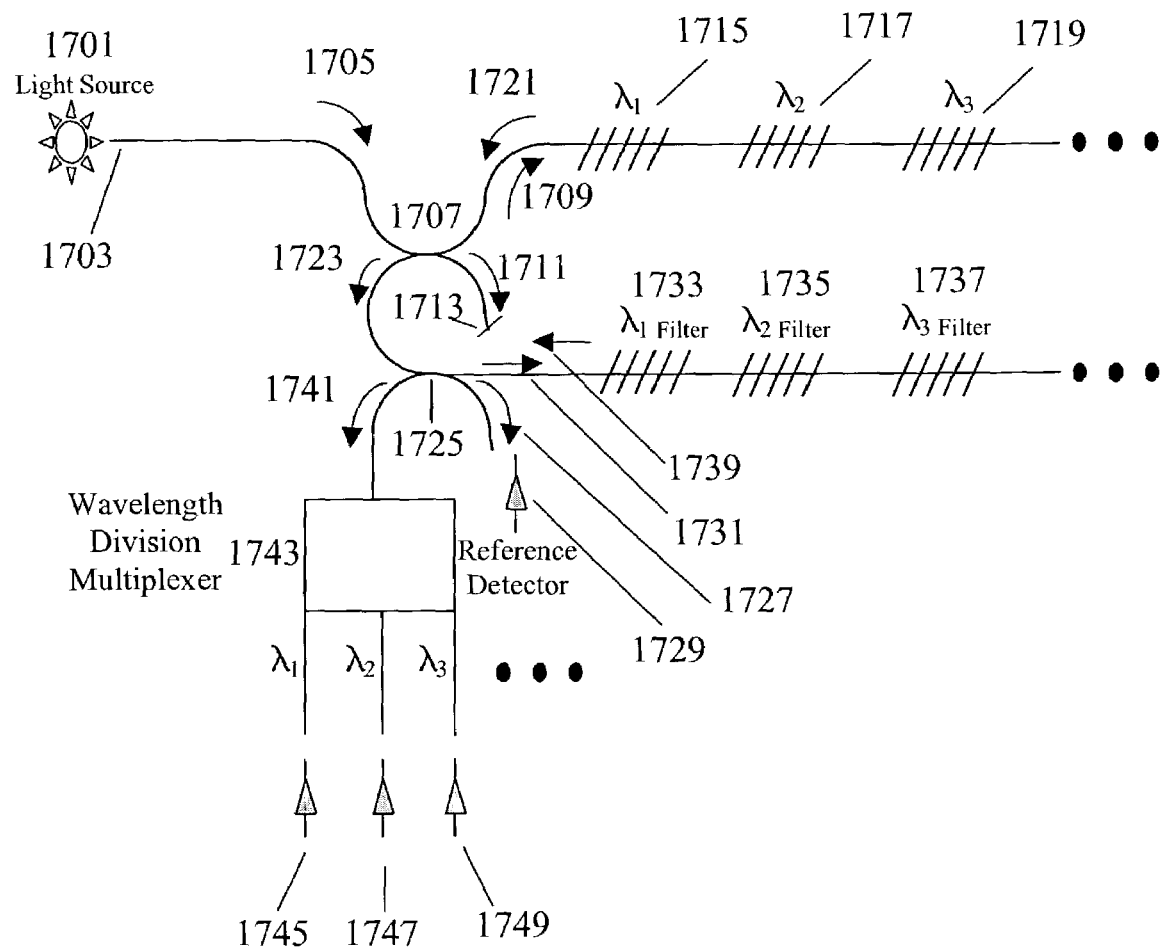
FIG. 39 is a diagram illustrating means to wavelength division multiplex the system shown in FIG. 2.

FIG. 39 show a method of wavelength division multiplexing the system of FIG. 2. Here a light source 1701 couples light into the fiber end 1703 to generate a light beam 1705 that is split by a fiber coupler 1709 into two light beams 1709 and 1711. The light beam 1711 propagates out of system at the port 1713. The other light beam 1707 propagates past the fiber grating sensors 1715, 1717 and 1719 with center wavelengths at $\lambda_1$, $\lambda_2$, $\lambda_3$ respectively which each reflect light beams wavelength encoded that are representative of environmental effects in their location. These reflected light beams 1721 propagate back to the fiber coupler 1707 and a portion of the light beams 1721 is directed as the light beam 1723 to the second fiber coupler 1725. A portion of the light beam 1723 is split by the coupler 1725 as the light beam 1727, which is directed to the output reference detector 1729 that is used to monitor the overall light levels in the system. The second part of the light beam 1731 is directed toward the fiber grating filters 1733, 1735 and 1737 centered about the wavelengths $\lambda_1$, $\lambda_2$, $\lambda_3$ that are used to modulate the fiber grating sensor signals to determine wavelength in a manner similar to that associated with FIG. 2. The modulated reflected light beam 1739 is directed back to the fiber coupler 1725 and a portion of this light beam 1741 is directed into a wavelength division multiplexing element 1743 used to sort out the wavelengths $\lambda_1$, $\lambda_2$, $\lambda_3$ to the corresponding output detectors 1745, 1747 and 1749.

Figure 40:
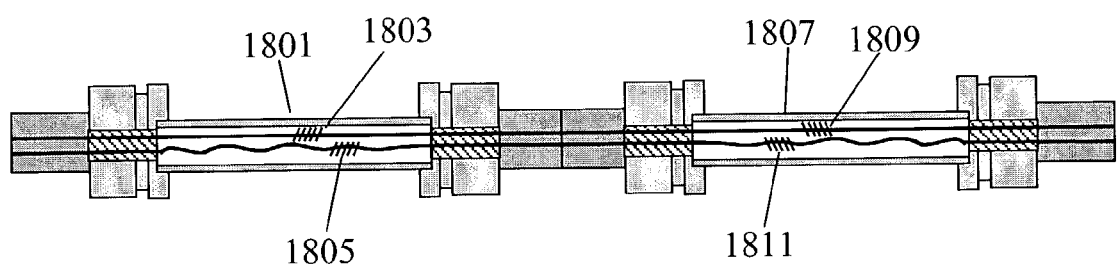
FIG. 40 is a diagram showing how fiber grating strain assemblies may be wavelength division multiplexed.

FIG. 40 is an illustration of how wavelength division multiplexing can be used to support two compensated fiber grating sensor assemblies in line. The assembly 1801 has a fiber grating sensor 1803 matched to a fiber grating filter 1805 both with a nominal operating wavelength in the region of $\lambda_1$. The assembly 1807 has a fiber grating sensor 1809 matched to a fiber grating filter 1811 in the region of an operating wavelength $\lambda_2$. Additional sensor assemblies could be multiplexed in line in a similar manner.

Figure 41:
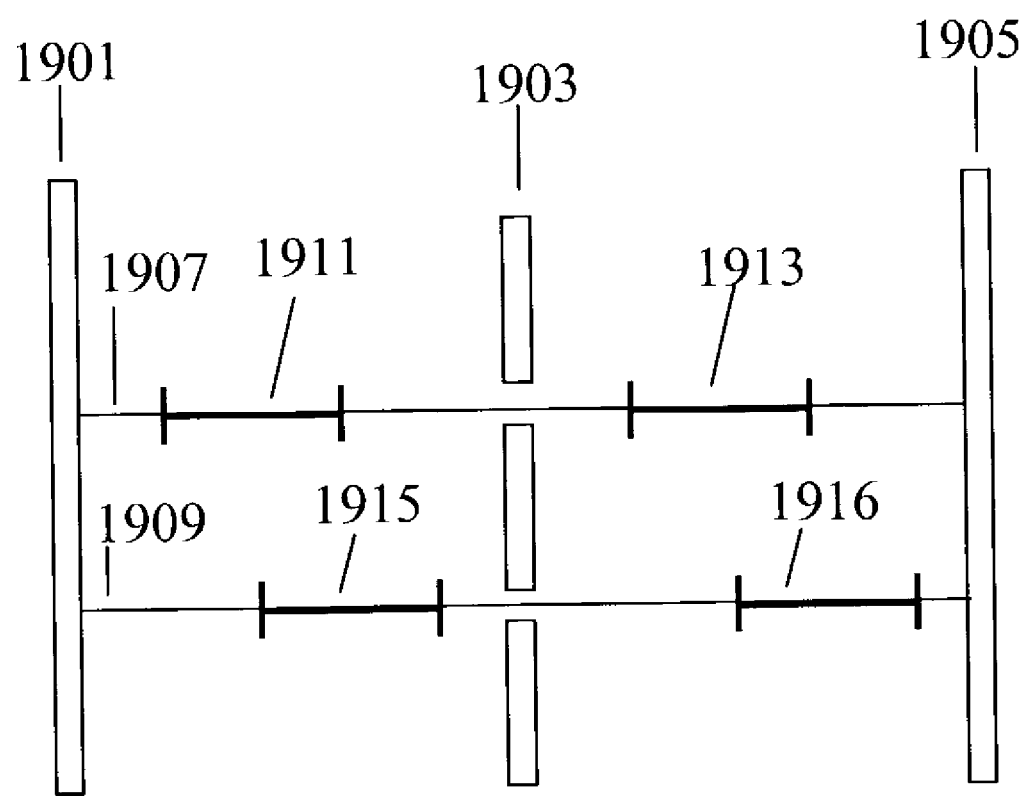
FIG. 41 shows how a fiber grating strain sensor system may be configured to support traffic monitoring and weigh in motion on a road.
Figure 42:
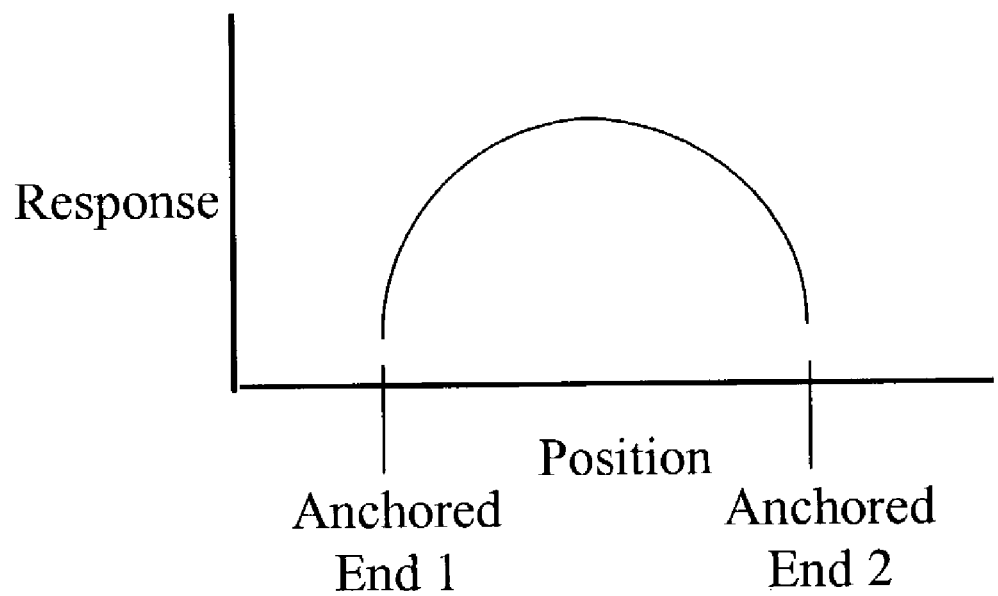
FIG. 42 is a graph illustrating the position dependent response of a fiber grating strain sensor with anchored ends buried in a roadway.

As an example of a system using these techniques FIG. 41 shows a layout used to support weigh in motion. In this case there are two lanes of traffic represented in FIG. 41 by the separating lines 1901, 1903 and 1905. There are two lines of sensor assemblies and 1907 and 1909. The line of sensors 1907 contains two sensor assemblies 1911 and 1913, which are offset from the two sensor assemblies 1915 and 1916. Wavelength division or spatial multiplexing or other multiplexing methods such as time division multiplexing may multiplex the sensors in the lines 1907 and 1909. The offsets may be necessary because the response of the sensors may be position dependent. FIG. 42 illustrates a representative response curve for a fiber sensor similar to that of FIG. 3 when placed at a depth of 3 inches into concrete. The sensor is most responsive in between the two anchor points and falls off toward each anchor point. The two offset sensor lines 1907 and 1909 allow determination of both the wheel position to allow a correction factor for the actual weight of the vehicle.

Many changes, modifications, alterations and other uses and applications which do not depart from the spirit and scope of the invention are deemed to be covered by the invention which is limited only by the claims which follow.

What is claimed is:

1. A fiber grating sensor system to measure environmental effects consisting of:
   light source means that couples light into one end of a first beamsplitter,
   a second end of said first beamsplitter that directs light toward a first fiber grating sensor,
   a third end of said first beamsplitter that is designed to be antireflective and,
   a fourth end to said first beamsplitter connecting to one end of a second beamsplitter,
   said second beamsplitter having a second end connected to a wavelength filter,
   said second beamsplitter having a third end connected to a first light output detection means and
   said second beamsplitter having a fourth end connected to a second light output detection means,
   and said first fiber grating sensor and said wavelength filter being substantially collocated to reduce undesired environmental effects.

2. The fiber grating sensor system of claim 1 where said wavelength filter is a fiber grating.

3. The fiber grating sensor system of claim 2 where said fiber grating sensor is bonded to surface with hard material and said fiber grating wavelength filter is bonded to the surface with soft material.

4. The fiber grating sensor system of claim 2 where said fiber grating sensor is bonded to a surface with soft material and said fiber grating wavelength filter is bonded to the surface with hard material.

5. The fiber grating sensor system of claim 2 where said fiber grating sensor is put under tension at anchor points and said fiber grating wavelength filter is placed in an unstrained condition.

6. The fiber grating sensor system of claim 5 where said fiber grating sensor is put under tension in a tube and is prestrained between two anchor points at either end of the tube and said fiber wavelength filter is attached to one end of said tube and unstrained in a second tube with low friction.

7. A fiber grating strain sensor consisting of a fiber grating inside a tube with one end of the optical fiber containing said fiber grating attached to one end of said tube and the other end of said optical fiber being in contact with the sidewall of said tube so that friction induced strain on said fiber grating may be measured.

8. A fiber grating strain sensor as in claim 7 where the interior surface of the said tube contains an adhesive to cause friction between said fiber grating and said tube.

9. A fiber grating strain sensor as in claim 7 where said tube containing said fiber grating is filled with a high viscosity fluid.

10. A fiber grating strain sensor consisting of a fiber grating inside a tube with one end of the optical fiber containing said fiber grating attached to one end of said tube and the other end of said optical fiber being attached to the second end of the tube with an elastic material so that said fiber grating sensor is under tension.

11. A fiber grating strain sensor as in claim 10 where said elastic material is a spring.

12. A fiber grating sensor system as in claim 2, that includes: said fiber grating sensor having a coating responsive to humidity, and said fiber grating filter having a coating that is responsive mainly to temperature, and having said fiber grating sensor and said fiber grating filter located in close physical proximity.

13. A fiber grating sensor system as in claim 12 that includes: said coating of said fiber grating sensor being polyimide and said coating of said fiber grating filter being epoxy acrylate.

14. The fiber grating sensor system of claim 1 where: said first light source couples into an N port coupler and each output of said N port coupler acts as a light source for N fiber grating sensor systems according to claim 1.

15. The fiber grating sensor system of claim 1 where: said second end of said first beamsplitting means has a plurality of fiber grating sensors centered at wavelengths $\lambda_1$, $\lambda_2$, $\lambda_3$, ... $\lambda_n$ and said second end of said second beamsplitting means has a plurality of wavelength matched fiber grating filters centered at $\lambda_1, \lambda_2, \lambda_3, \ldots \lambda_n$ and said fourth end of said second beamsplitting means being connected to wavelength division multiplexing means whose outputs are connected to a plurality of detector means to monitor output wavelength signals at $\lambda_1, \lambda_2, \lambda_3, \ldots \lambda_n$.

16. A fiber grating sensor system to measure environmental effects as in claim 1 where said first beamsplitter is a circulator: said circulator having first end attached to said light source, said circulator having second end attached to said fiber grating sensor and having third end attached to said first end of said second beamsplitter.

* * * * *